US012439088B2

(12) United States Patent
Hendry

(10) Patent No.: US 12,439,088 B2
(45) Date of Patent: Oct. 7, 2025

(54) METHOD AND APPARATUS FOR GENERATING AND PROCESSING MEDIA FILE

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 18/258,733

(22) PCT Filed: Dec. 8, 2021

(86) PCT No.: PCT/KR2021/018505
§ 371 (c)(1),
(2) Date: Jun. 21, 2023

(87) PCT Pub. No.: WO2022/139260
PCT Pub. Date: Jun. 30, 2022

(65) Prior Publication Data
US 2024/0048768 A1   Feb. 8, 2024

Related U.S. Application Data

(60) Provisional application No. 63/128,196, filed on Dec. 21, 2020.

(51) Int. Cl.
*H04N 19/70* (2014.01)
*H04N 7/01* (2006.01)

(52) U.S. Cl.
CPC ............ *H04N 19/70* (2014.11); *H04N 7/013* (2013.01)

(58) Field of Classification Search
None
See application file for complete search history.

(56) References Cited

U.S. PATENT DOCUMENTS

| 10,567,804 B2 * | 2/2020 | Chen ................. H04N 21/2401 |
| 2015/0341649 A1 * | 11/2015 | Narasimhan ......... H04N 19/187 |
| | | 375/240.12 |

(Continued)

FOREIGN PATENT DOCUMENTS

| KR | 10-2015-0139945 | 12/2015 |
| KR | 10-2018-0019557 | 2/2018 |

(Continued)

OTHER PUBLICATIONS

International Telecommunication Union, "Versatile video coding," Series H: Audiovisual and Multimedia Systems Infrastructure of audiovisual services—Coding of moving video, Recommendation ITU-T H.266, Aug. 2020, 517 pages.

*Primary Examiner* — Stefan Gadomski
(74) *Attorney, Agent, or Firm* — Fish & Richardson P.C.

(57) ABSTRACT

Disclosed are a method and device for transmitting/receiving a downlink channel from multiple transmission/reception points in a wireless communication system. A method for a terminal to receive a downlink channel in a wireless communication system according to an embodiment of the present disclosure comprises the steps of: receiving a downlink control channel on the basis of two or more transmission configuration indicator (TCI) states associated with one or more control resource sets (CORESETs); and receiving a downlink data channel on the basis of the two or more TCI states associated with one or more CORESETs, on the basis of TCI information not being included in downlink control information (DCI) received through the downlink control channel, wherein the two or more TCI states may be mapped to the downlink data channel on the basis of a prescribed mapping scheme.

12 Claims, 5 Drawing Sheets

(56) References Cited

U.S. PATENT DOCUMENTS

| | | | |
|---|---|---|---|
| 2016/0105688 A1* | 4/2016 | Hendry | H04N 19/44 |
| | | | 375/240.25 |
| 2016/0234518 A1* | 8/2016 | Hendry | H04N 21/235 |
| 2016/0373771 A1* | 12/2016 | Hendry | H04N 19/30 |
| 2017/0111650 A1* | 4/2017 | Hendry | H04N 19/70 |
| 2018/0146225 A1* | 5/2018 | Hannuksela | H04N 21/4402 |
| 2018/0160156 A1* | 6/2018 | Hannuksela | H04N 21/8456 |
| 2018/0184098 A1* | 6/2018 | Denoual | H04N 19/30 |
| 2019/0058895 A1* | 2/2019 | Deshpande | H04N 19/423 |
| 2022/0086496 A1* | 3/2022 | Wang | H04N 19/188 |
| 2022/0166997 A1* | 5/2022 | Denoual | H04N 21/2353 |
| 2023/0037902 A1* | 2/2023 | Sánchez De La Fuente | |
| | | | H04N 19/188 |
| 2023/0089495 A1* | 3/2023 | Sánchez De La Fuente et al. | |
| | | | H04N 21/435 |
| | | | 725/86 |

FOREIGN PATENT DOCUMENTS

| | | |
|---|---|---|
| KR | 102148548 | 8/2020 |
| KR | 102191873 | 12/2020 |

* cited by examiner

METHOD AND APPARATUS FOR GENERATING AND PROCESSING MEDIA FILE

CROSS-REFERENCE TO RELATED APPLICATIONS

This application is a National Stage application under 35 U.S.C. § 371 of International Application No. PCT/KR2021/018505, filed on Dec. 8, 2021, which claims the benefit of U.S. Provisional Application No. 63/128,196, filed on Dec. 21, 2020. The disclosures of the prior applications are incorporated by reference in their entirety.

TECHNICAL FIELD

The present disclosure relates to an image coding technology and in more detail, relates to a method and a device of generating and processing a media file for coded image information in an image coding system.

BACKGROUND

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

According to an embodiment of the present disclosure, a method of generating a media file is provided. The method may be performed by a media file generation device. The method may include storing at least one of network adaptation layer (NAL) units including video information in a track of a file format, configuring a syntax of an operation point entity group in a file format, wherein an operation point entity group includes information on operation points and information related to mapping of a track for operation points, and generating a media file based on a file format. An operation point entity group may include flag information regarding whether a list of layers exists and layers may belong to an output layer set related to at least one of operation points.

According to another embodiment of the present disclosure, a method of processing a media file is provided. The method may be performed by a device of processing a media file. The method may include parsing at least one of NAL units including video information in a track of a file format and parsing a syntax of an operation point entity group in a file format, wherein an operation point entity group includes information on operation points and information related to mapping of a track for operation points. An operation point entity group may include flag information regarding whether a list of layers exists and layers may belong to an output layer set related to at least one of operation points.

According to another embodiment of the present disclosure, a computer-readable digital storage medium that a media file is stored is provided. The method of generating a media file may include storing at least one of NAL units including video information in a track of a file format, configuring a syntax of an operation point entity group in a file format, wherein an operation point entity group includes information on operation points and information related to mapping of a track for operation points, and generating a media file based on a file format. An operation point entity group may include flag information regarding whether a list of layers exists and layers may belong to an output layer set related to at least one of operation points.

According to another embodiment of the present disclosure, a computer-readable digital storage medium that a media file is stored is provided. The method of processing a media file may include parsing at least one of NAL units including video information in a track of a file format from a media file and parsing a syntax of an operation point entity group in a file format, wherein an operation point entity group includes information on operation points and information related to mapping of a track for operation points. An operation point entity group may include flag information regarding whether a list of layers exists and layers may belong to an output layer set related to at least one of operation points.

According to embodiments of the present disclosure, since whether a list of layer IDs for each output layer set exists is checked with a flag, efficiency of signaling may be improved by reducing signaling for unnecessary information.

According to embodiments of the present disclosure, individual information for each output layer set may be signaled and accordingly, accuracy of picture reconstruction may be increased and subjective/objective image quality of a reconstructed picture may be improved.

DETAILED DESCRIPTION

Figure 1:
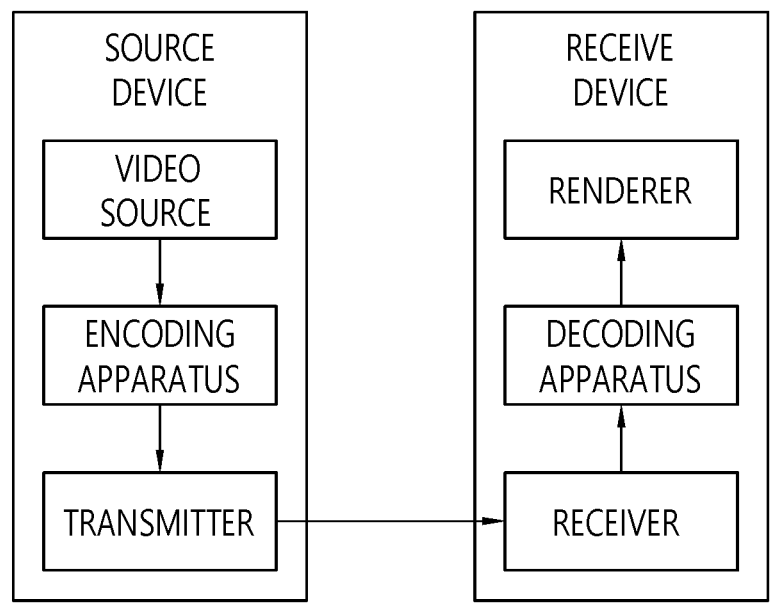
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
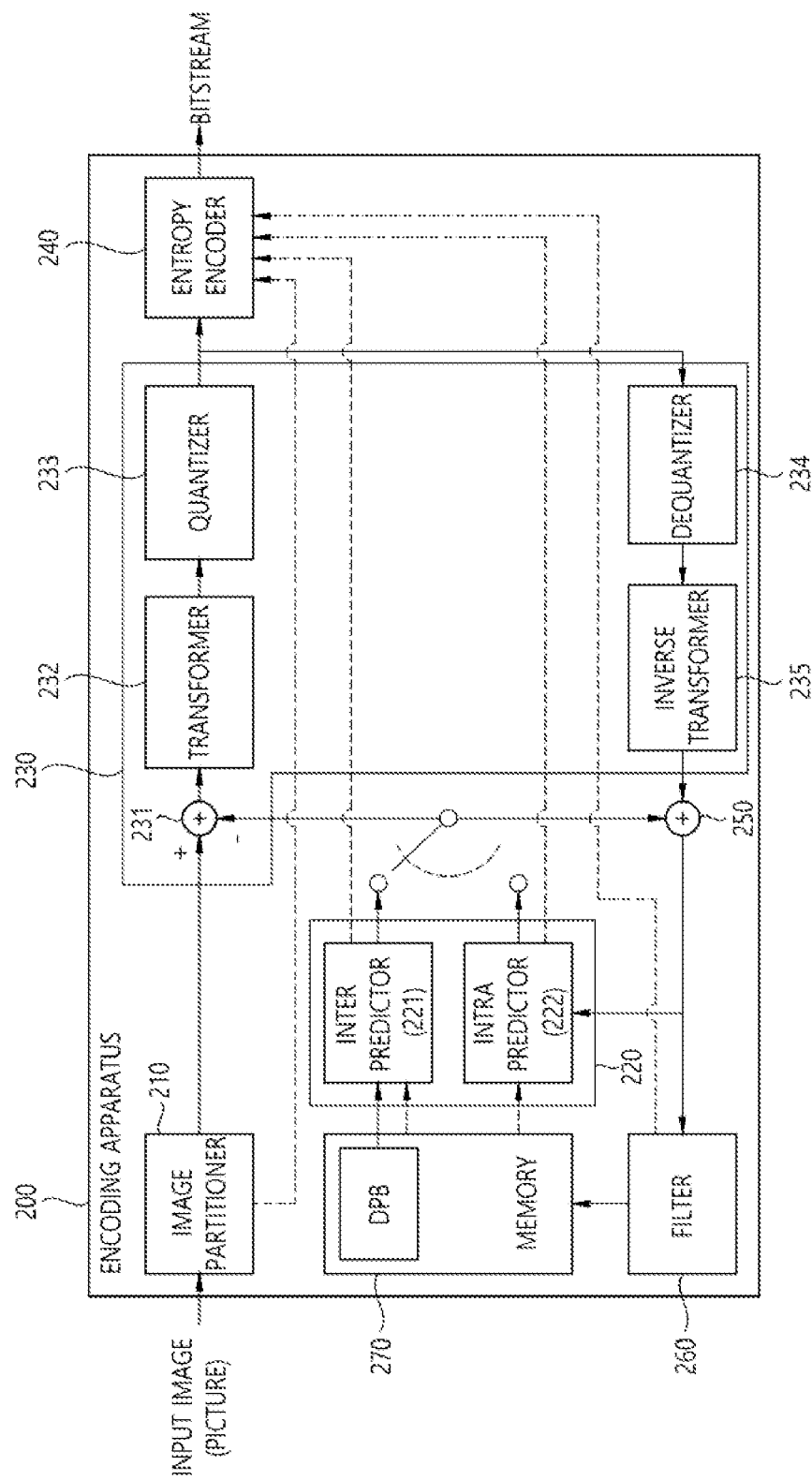
FIG. 2 is a schematic diagram illustrating a configuration of a video/image encoding apparatus to which the embodiments of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown)

storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
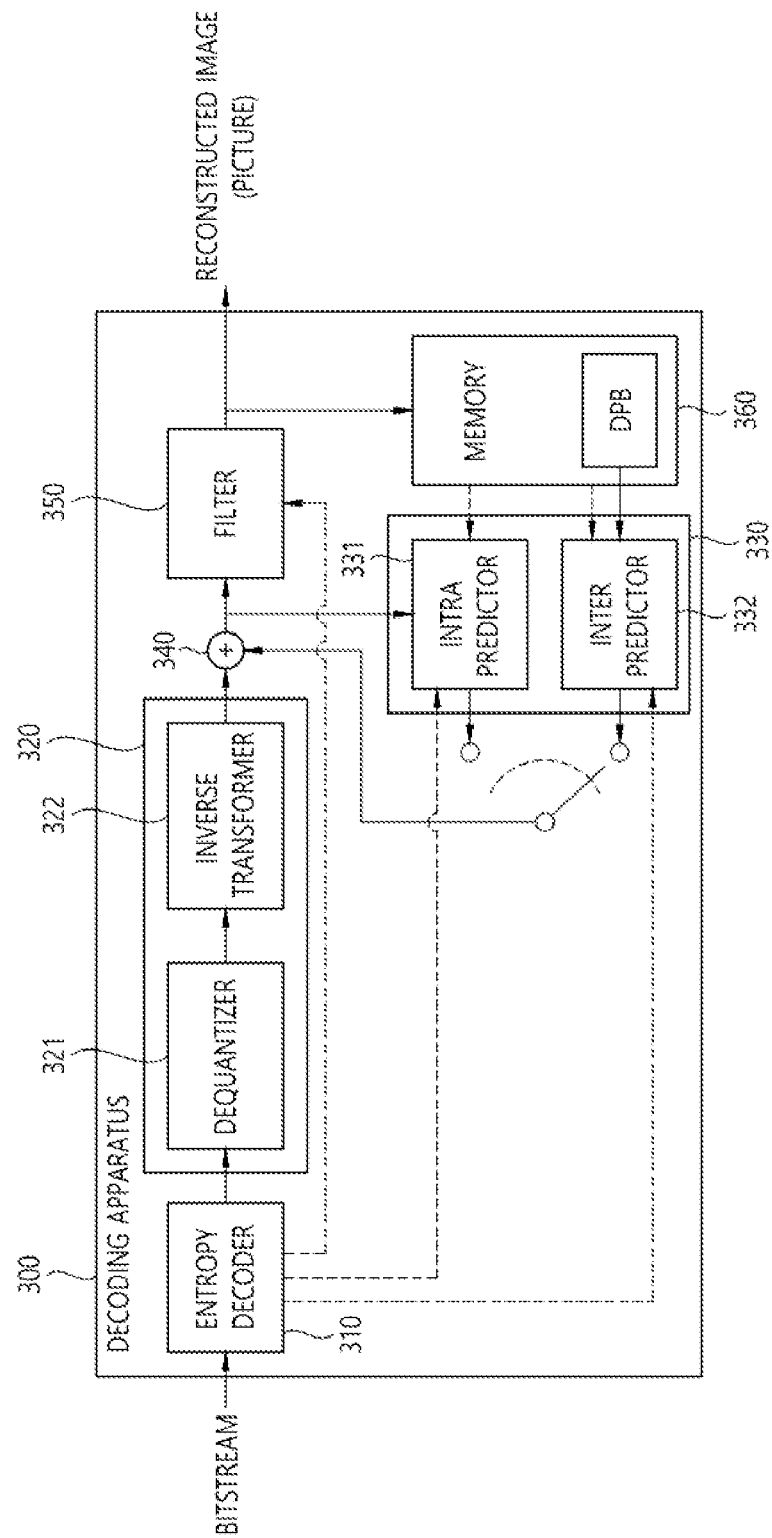
FIG. 3 is a schematic diagram illustrating a configuration of a video/image decoding apparatus to which the embodiments of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be equally applied or applied correspondingly to the filter 350, the inter predictor 332, and the intra predictor 331 of the decoding apparatus 300.

Meanwhile, the above-described encoded image/video information may be configured based on a media file format to generate a media file. For example, encoded image/video information may form a media file (segment) based on one or more NAL unit/sample entries for the encoded image/video information. The media file may include a sample entry and a track. For example, a media file (segment) may include various records, and each record may include image/video related information or media file format related information. Also, for example, one or more NAL units may be stored in a configuration record (or decoder configuration record, or VVC decoder configuration record) field of a media file. Here, the field may also be called a syntax element. Also, for example, the media file may include VvcOperatingPointsRecord (an operating point information sample group) and/or OperatingPointGroupBox (an operating point entity group) described later.

For example, ISO Base Media File Format (ISOBMFF) may be used as a media file format to which the method/embodiment disclosed in the present disclosure may be applied. ISOBMFF may be used as the basis for many codec encapsulation formats such as AVC file format, HEVC file format and/or VVC file format and many multimedia container formats such as MPEG-4 file format, 3GPP file format (3GP) and/or DVB file format. Also, in addition to continuous media such as audio and video, static media such as images and metadata may be stored in a file according to ISOBMFF. A file structured according to ISOBMFF may be used for various purposes such as local media file playback, progressive downloading of a remote file, segments for Dynamic Adaptive Streaming over HTTP (DASH), containers and packetization instructions of content to be streamed, and recording of received real-time media streams.

A 'box' described later may be an elementary syntax element of ISOBMFF. An ISOBMFF file may consist of a sequence of boxes, and each box may contain other boxes. For example, a movie box (a box whose grouping type is 'moov') may include metadata for continuous media streams in a media file, and each stream may be represent as a track in a file. Metadata for a track may be included in a track box (a box whose grouping type is 'trak'), and media content of a track may be included in a media data box (a box whose grouping type is 'mdat') or directly in a separate file. The media content of a track may consist of a sequence of samples, such as audio or video access units. For example, ISOBMFF may include a media track including an elementary media stream, media transmission instructions. ISOBMFF may specify types of tracks such as a hint track representing the received packet stream and a timed metadata track including time synchronized metadata.

Also, ISOBMFF is designed for storage, but is also very useful for streaming such as progressive download or DASH. For streaming purposes, movie fragments defined in ISOBMFF may be used. A fragmented ISOBMFF file may represent, for example, two tracks related to video and audio. For example, if random access is included after receiving a 'moov' box, all movie fragments 'moof' may be decoded along with related media data.

In addition, the metadata of each track may include a list of sample description entries providing a coding or encapsulation format used in the track and initialization data necessary to process the format. Also, each sample may be associated with one of the sample description entries of the track.

Using ISOBMFF, sample-specific metadata may be specified by various mechanisms. Specific boxes within a sample table box (a boxe whose grouping type is 'stbl') may be standardized to correspond to general requirements. For example, a sync sample box (a box whose grouping type is 'stss') may be used to list random access samples of a track. The sample grouping mechanism allows to map samples according to a four-character grouping type into groups of samples that share the same property specified by a sample group description entry in the file. Several grouping types may be specified in ISOBMFF.

On the other hand, a 'sample' described later may be all data related to a single time or single element in one of three sample arrays (Y, Cb, Cr) representing a picture. For example, when the term 'sample' is used in the context of a track (of a media file format), it may refer to all data related to a single time of the track. Here, the time may be a decoding time or a composition time. In addition, for example, when the term 'sample' is used in the context of a picture, that is, when it is used with the phrase "luma sample", it may refer to a single element in one of the three sample arrays representing the picture.

Meanwhile, in order to store VVC content, the following three types of elementary streams may be defined.

A video elementary stream may include VCL NAL units and may not include parameter sets, DCI, and OPI NAL units. Here, all parameter sets, DCI, OPI NAL units may be stored in at least one sample entry. In an example, a video elementary stream may include non-VCL NAL units which are not parameter sets, which are not DCI NAL units and which are not OPI NAL units.

A video and parameter set elementary stream may include VCL NAL units, include parameter sets, DCI, or OPI NAL units and have at least one sample entry that the parameter sets, DCI or OPI NAL units are stored.

A non-VCL elementary stream includes only non-VCL NAL units and these non-VCL NAL units are synchronized to an elementary stream included in a video track. Here, a VVC non-VCL track does not include parameter sets, DCI or OPI NAL units in sample entries.

Regarding definition of a VVC video stream, sample entry types may include 'vvc1', 'vvi1' and 'vvs1', box types may include 'vvcC' and 'vvnC', a container may represent a sample table box ('stbl'), a 'vvc1' or 'vvi1' sample entry may be mandatory in at least one track of tracks carrying a VVC bitstream and a quantity may mean that at least one sample entry exists. A VVC sample entry may be defined as a sample entry that a sample entry type is 'vvc1' or 'vvi1'. Each sample entry of a VVC track may be a VVC sample entry. A VVC sample entry may include a VVC Configuration Box defined below. For example, a VVC sample entry may include VvcDecoderConfigurationRecord.

A selective BitRateBox may exist in a VVC sample entry to signal bit transmission rate information of a VVC video stream. When used in MPEG-4, extension descriptors which should be inserted into an elementary stream descriptor may also exist. As allowed in a ISO Base Media File Format specification, several sample entries may be used to represent video sections using different configurations or parameter sets.

When a VVC sub-picture track includes a conforming VVC bitstream which may be consumed without other VVC sub-picture tracks, a regular VVC sample entry ('vvc1' or 'vvi1') may be used for the VVC sub-picture track. Otherwise, a 'vvs1' sample entry may be used for the VVC sub-picture track and the following constraint may be applied to a track.

- A track in movie flag is 0.
- A track includes only one sample entry.
- A track is referred to by at least one VVC base track through a 'subp' track reference.
- DCI, OPI, VPS, SPS, PPS, AUD, PH, EOS, EOB and other AU- or picture-level non-VCL NAL units do not exist in both a sample entry and samples of 'vvs1' tracks.
- Unless otherwise specified, child boxes of video sample entries (e.g.: CleanApertureBox and PixelAspectRatioBox) should not exist in a sample entry and if they exist, they are ignored.
- Unless all VCL NAL units included in a sample comply with a synchronization sample requirement, a sample is not indicated as a synchronization sample.
- There is no composition time offset information for samples of a 'vvs1' track.
- There may be subsample information for samples of a 'vvs1' track. If it exists, subsample information should follow definition of a subsample for a VVC.

A VVC track may include a 'subp' track reference with entries including one of a track BD value of a VVC sub-picture track or a track group_id value of an 'alte' track group of a VVC sub-picture track. In an example, a 'spor' type of sample group may be included in each VVC base track. For example, when a dedicated sample entry type for a VVC base track is used, a VVC base track may be indicated through a codec MIME parameter of a track type. On the other hand, it may be not desirable to designate a large number of VVC sample entry types. In an example, a 'vvs1' type of sample entry may include a VvcNALUConfigBox.

When a VVC sub-picture track is referred to by a VVC base track including a 'spor' sample group description entry that subpic_id info flag is 1, a VVC sub-picture track may potentially include a sub-picture ID sample group description using a default sample grouping mechanism.

When a sample entry name is 'vvc1' or 'vvi1', a stream to which this sample entry is applied may be a compliant VVC stream from a viewpoint of a VVC decoder operating in a configuration (including a profile, a tier, and a level) by VVCConfigurationBox.

When a sample entry name is 'vvc1', a value of array_completeness may be the same as 1 for arrays of DCI, VPS, SPS and PPS NAL units and may be the same as 0 for all other arrays. When a sample entry name is 'vvi1', a value of array_completeness may be the same as 0 for all arrays.

When a track does not include an original VVC bitstream and does not represent a VVC bitstream after confirming 'subp' and 'vvcN' track references (if any), a track may contain an 'oref' track reference for a track including a 'vopi' sample group or an Operating Points Entity Group. In an example, all other VVC tracks of a VVC bitstream may have an 'oref' type of track reference for a track carrying a 'vopi' sample group. For example, when a single layer VVC bitstream includes two time sub-layers stored in different tracks, a track including a sub-layer that TemporalId is 1 may include an 'oref' track reference for a track including a sub-layer that TemporalId is 0.

Meanwhile, the operating points information of the ISO based media file format (ISOBMF) for VVC may be signaled as a sample in a group box whose grouping type is 'vopi' or an entity group whose grouping type is 'opeg'. Here, the operating point may be a temporal subset of the OLS identified by an Output Layer Set (OLS) index and a highest value of TemporalId. Each operating point may be associated with a profile, tier, and level (i.e., PTL) that defines the conformance point of the operating point. The operating points information may be needed to identify a sample and a sample entry for each operating point.

Information on the constitution of the operating points may be provided to applications using various operating points and an operating point information sample group ('vopi') provided in a given VVC bitstream. Each operating point is associated with OLS, the maximum TemporalId value, profile, tier and level signaling. All of the above information may be captured by the 'vopi' sample group. Apart from the above information, the sample group may also provide dependency information between layers.

Meanwhile, when one or more VVC tracks exist for a VVC bitstream and an operating point entity group does not exist for the VVC bitstream, all of the following items may be applied.

- Among the VVC tracks for the VVC bitstream, there shall be only one track that carries a 'vopi' sample group.
- All the other VVC tracks of the VVC bitstream shall have a track reference of type 'oref' for the track that carries the 'vopi' sample group.
- In addition, for any specific sample in a given track, a temporally collocated sample in another track may be defined as a sample having the same decoding time as the specific sample. For each sample SN of a track TN that has an 'oref' track reference for a track Tk that carries a 'vopi' sample group, the following may apply.
  - If there is a temporally collocated sample Sk in the track Tk, the sample SN may be associated with the same 'vopi' sample group entity as the sample Sk.
  - Otherwise, sample SN may be associated with the same vopi' sample group entity as the last of samples in the track Tk that precedes sample SN in decoding time.

When several VPSs are referenced in the VVC bitstream, several entities may need to be included in a sample group description box with grouping type matching 'vopi'. In the more common case where a single VPS is present, it may be recommended to use the default sample group mechanism defined in ISO/IEC 14496-12 and include the operating point information sample group in the sample table box, rather than including it in each track fragment.

Also, grouping_type_parameter may not be defined for SampleToGroupBox whose grouping type is 'vopi'.

The 'vopi' sample group including the above-described operating point information, that is, the syntax of the operating point information sample group may be as shown in the table below.

TABLE 1

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(1) all_independent_layers_flag;
    bit(7) reserved = 0;
    if (all_independent_layers_flag) {
        unsigned int(1) each_layer_is_an_ols_flag;
        bit(7) reserved = 0;
    } else
        unsigned int(8) ols_mode_idc;
    bit(7) reserved = 0;
    unsigned int(9) num_olss;
    for (i=0; i<num_olss; i++) {
```

TABLE 1-continued

```
      unsigned int(8) ptl_idx[i];
      unsigned int(9) output_layer_set_idx[i];
      unsigned int(6) layer_count[i];
      bit(1) reserved = 0;
      for (j=0; j<layer_count; j++) {
         unsigned int(6) layer_id[i][j];
         unsigned int(1) is_output_layer[i][j];
         bit(1) reserved = 0;
      }
   }
   bit(4) reserved = 0;
   unsigned int(12) num_operating_points;
   for (i=0; i<num_operating_points; i++) {
      unsigned int(9) ols_idx;
      unsigned int(3) max_temporal_id;
      unsigned int(1) frame_rate_info_flag
      unsigned int(1) bit_rate_info_flag
      bit(5) reserved = 0;
      unsigned int(2) chroma_format_idc;
      unsigned int(3) bit_depth_minus8;
      unsigned int(16) picture_width;
      unsigned int(16) picture_height;
      if (frame_rate_info_flag) {
         unsigned int(16) avgFrameRate;
         bit(6) reserved = 0;
         unsigned int(2) constant FrameRate;
      }
      if (bit_rate_info_flag) {
         unsigned int(32) maxBitRate;
         unsigned int(32) avgBitRate;
      }
   }
   unsigned int(8) max_layer_count;
   for (i=0; i<max_layer_count; i++) {
      unsigned int(8) layerID;
      unsigned int(8) num_direct_ref_layers;
      for (j=0; j<num_direct_ref_layers; j++) {
         unsigned int(8) direct_ref_layerID;
         unsigned int(8) max_tid_il_ref_pics_plus1;
      }
   }
}
class VvcOperatingPointsInformation extends
VisualSampleGroupEntry ('vopi') {
   VvcOperatingPointsRecord oinf;
}
```

In addition, semantics of the syntax of the operating point information sample group may be as shown in the following table.

TABLE 2 num_profile_tier_level_minus1 plus 1 gives the number of the subsequent profiles, tier, and level combinations as well as the associated fields.
ptl_max_temporal_id[i]: Gives the maximum TemporalID of NAL units of the associated bitstream for the specified i-th profile, tier, and level structure.
NOTE 1: The semantics of ptl_max_temporal_id[i] and max_temporal_id of an operating point, given below, are different even though they may carry the same numerical value.
ptl[i] specifies the i-th profile, tier, and level structure.
all_independent_layers_flag, each_layer_is_an_ols_flag, ols_mode_idc and max_tid_il_ref_pics_plus1 are defined in ISO/IEC 23090-3.
num_olss specifies the number of output layer sets signalled in this syntax structure. The value of num_olss shall be less than or equal to the value of TotalNumOlss as specified in ISO/IEC 23090-3.
ptl_idx[i] specifies the zero-based index of the listed profile, tier, and level structure for the i-th output layer set signalled in this syntax structure.
output_layer_set_idx[i] is the output layer set index of the i-th output layer set signalled in this syntax structure.
layer_count[i] specifies the number of layers in the i-th output layer set signalled in this syntax structure.
layer_id[i][j] specifies the nuh_layer_id value for the j-th layer in the i-th output layer set signalled in this syntax structure.
is_output_layer[i][j] equal to 1 specifies that the j-th layer is an output layer in the i-th output layer set signalled in this syntax structure. is_output_layer[i][j] equal to 0 specifies that the j-th layer in not an output layer in the i-th output layer set signalled in this syntax structure.
num_operating_points: Gives the number of operating points for which the information follows.
ols_idx is the index to the list of output layer sets signalled in this syntax structure for the operating point.
max_temporal_id indicates the maximum TemporalId of NAL units of this operating point.
frame_rate_info_flag equal to 0 indicates that no frame rate information is present for the operating point. The value 1 indicates that frame rate information is present for the operating point.
bit_rate_info_flag equal to 0 indicates that no bitrate information is present for the operating point. The value 1 indicates that bitrate information is present for the operating point.
chroma_format_idc indicates the chroma format that applies to this operating point. The following constraints apply for chroma_format_idc:
If this operating point contains only one layer, the value of sps_chroma_format_idc, as defined in ISO/IEC 23090-3, shall be the same in all SPSs referenced by the VCL NAL units in the VVC bitstream of this operating point, and the value of chroma_format_idc shall be equal to that value of sps_chroma_format_idc.
Otherwise (this operating point contains more than one layer), the value of chroma_format_idc shall be equal to the value of vps_ols_dph_chroma_format[ MultiLayerOlsIdx[ output_layer_set_idx ] ], as defined in ISO/IEC 23090-3.
bit_depth_minus8 indicates the bit depth that applies to this operating point. The following constraints apply for bit_depth_minus8:
If this operating point contains only one layer, the value of sps_bitdepth_minus8, as defined in ISO/IEC 23090-3, shall be the same in all SPSs referenced by the VCL NAL units in the VVC

TABLE 2-continued bitstream of this operating point, and the value of bit_depth_minus8 shall be equal to that
value of sps_bitdepth_minus8.
Otherwise(this operating point contains more than one layer), the value of bit_depth_minus8
shall be equal to the value of
vps_ols_dpb_bitdepth_minus8[ MultiLayerOlsIdx[ output_layer_set_idx ] ], as defined
in ISO/IEC 23090-3.
picture_width indicates the maximum picture width, in units of luma samples, that
applies to this operating point. The following constraints apply for picture_width:
If this operating point contains only one layer, the value of sps_pic_width_max_in_luma_samples,
as defined in ISO/IEC 23090-3, shall be the same in all SPSs referenced by the VCL NAL units
in the VVC bitstream of this operating point, and the value of picture_width shall be equal
to that value of sps_pic_width_max_in_luma_samples.
Otherwise (this operating point contains more than one layer), the value of picture_width
shall be equal to the value of
vps_ols_dpb_pic_width[ MultiLayerOlsIdx[ output_layer_set_idx ] ], as defined in
ISO/IEC 23090-3.
picture_height indicates the maximum picture height, in units of luma samples, that
applies to this operating point. The following constraints apply for picture_height:
If this operating point contains only one layer, the value of
sps_pic_height_max_in_luma_samples, as defined in ISO/IEC 23090-3, shall be the
same in all SPSs referenced by the VCL NAL units in the VVC bitstream of this operating
point, and the value of picture_height shall be equal to that value of
sps_pic_height_max_in_luma_samples.
Otherwise (this operating point contains more than one layer), the value of
picture_height shall be equal to the value of
vps_ols_dpb_pic_height[ MultiLayerOlsIdx[ output_layer_set_idx ] ], as
defined in ISO/IEC 23090-3.
avgFrameRate gives the average frame rate in unit of frames/(256 seconds) for the
operating point. Value 0 indicates an unspecified average frame rate. When the bitstream
of the operating point contains multiple layers, this gives the average access unit rate.
constantFrameRate equal to 1 indicates that the stream of the operating point is of
constant frame rate. Value 2 indicates that the representation of each temporal layer in the
stream of the operating point is of constant frame rate. Value 0 indicates that the stream of
the operating point may or may not be of constant frame rate. When the bitstream of the
operating point contains multiple layers, this gives the indication of whether the bitstream
of the operating point has constant access unit rate.
maxBitRate gives the maximum bit rate in bits/second of the stream of the operating
point, over any window of one second.
avgBitRate gives the average bit rate in bits/second of the stream of the operating
point.
max_layer_count specifies the count of all unique layers in all of the operating points
described in the sample group entry.
layerID specifies nuh_layer_id of a layer for which all the direct reference layers are
given in the following loop of direct_ref_layerID.
num_direct_ref_layers specifies the number of direct reference layers for the layer
with nuh_layer_id equal to layerID
direct_ref_layerID indicates nuh_layer_id of the reference layer.
max_tid_il_ref_pics_plus1 equal to 0 specifies that the pictures of the layer with
nuh_layer_id equal to direct_ref_layerID that are neither IRAP pictures nor GDR
pictures with ph_recovery_poc_cnt equal to 0 are not used as inter-layer reference pictures
for decoding of pictures of the later with nuh_layer_id equal to layerID. A value greater
than 0 specifies that, for decoding pictures of the layer with nuh_layer_id equal to
layerID, no picture from the layer with nuh_layer_id equal to
direct_ref_layerID with TemporalID greater than
max_tid_il_ref_pics_plus1 − 1 is used as an inter-layer reference picture and no
APS with nuh_layer_id equal to direct_ref_layerID and TemporalID greater than
max_tid_il_ref_pics_plus1 − 1 is referenced.

For example, referring to Table 2, a value obtained by adding 1 to the syntax element num_profile_tier_level_minus1 may represent the number of fields related to profiles, tier, and level combinations.

When a sample of a track mapped to an operation point described in the operation point entity group is aggregated, an implicit reconstruction process does not need to remove VCL NAL units any more in order to obtain a conforming VVC bitstream. A track belonging to the operation point entity group should have an 'oref' type of track reference for group_id indicated in the operation point entity group and should not include a 'vopi' sample group.

In addition, all entity_id values included in the operation point entity groups represent track IDs of tracks belonging to the same VVC bitstream. When it exists, OperatingPointGroupBox is included in GroupsListBox of file-level MetaBox and is not included in other levels of MetaBox. Here, OperatingPointGroupBox may represent the operation point entity group.

The above-described syntax of the operating point entity group may be as shown in the table below.

TABLE 3

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VVcPTLRecord(0) opeg_ptl[i];
    bit(7) reserved = 0;
    unsigned int(9) num_olss;
    for (i=0; i<num_olss; i++) {
        unsigned int(8) ptl_idx[i];
```

TABLE 3-continued

```
    unsigned int(9) output_layer_set_idx[i];
    unsigned int(6) layer_count[i];
    bit(1) reserved = 0;
    for (j=0; j<layer_count; j++) {
        unsigned int(6) layer_id[i][j];
        unsigned int(1) is_output_layer[i][j];
        bit(1) reserved = 0;
    }
}
bit(4) reserved = 0;
unsigned int(12) num_operating_points;
for (i=0; i<num_operating_points; i++) {
    unsigned int(9) ols_idx;
    unsigned int(3) max_temporal_id;
    unsigned int(1) frame_rate_info_flag
    unsigned int(1) bit_rate_info_flag
    bit(5) reserved = 0;
    unsigned int(2) chroma_format_idc;
    unsigned int(3) bit_depth_minus8;
    unsigned int(16) picture_width;
```

TABLE 3-continued

```
    unsigned int(16) picture_height;
    if (frame_rate_info_flag) {
        unsigned int(16) avgFrameRate;
        bit(6) reserved = 0;
        unsigned int(2) constantFrameRate;
    }
    if (bit_rate_info_flag) {
        unsigned int(32) maxBitRate;
        unsigned int(32) avgBitRate;
    }
    unsigned int(8) entity_count;
    for (j=0; j<entity_count; j++) {
        unsigned int(8) entity_idx;
    }
  }
}
```

In addition, semantics of the syntax of the operating point entity group may be as shown in the following table.

TABLE 4 num_profile_tier_level_minus1 plus 1 gives the number of following profiles, tier, and level combinations as well as the associated fields.
opeg_ptl[i] specifies the i-th profile, tier, and level structure.
num_olss specifies the number of output layer sets signalled in this syntax structure. The value of num_olss shall be less than or equal to the value of TotalNumOlss as specified in ISO/IEC 23090-3.
ptl_idx[i] specifies the zero-based index of the listed profile, tier, and level structure for the i-th output layer set signalled in this syntax structure.
output_layer_set_idx[i] is the output layer set index of the i-th output layer set signalled in this syntax structure.
layer_count[i] specifies the number of layers in the i-th output layer set signalled in this syntax structure.
layer_id[i][j] specifies the nuh_layer_id value for the j-th layer in the i-th output layer set signalled in this syntax structure.
is_output_layer[i][j] equal to 1 specifies that the j-th layer is an output layer in the i-th output layer set signalled in this syntax structure. is_output_layer[i][j] equal to 0 specifies that the j-th layer in not an output layer in the i-th output layer set signalled in this syntax structure.
num_operating_points: Gives the number of operating points for which the information follows.
ols_idx is the index to the list of output layer sets signalled in this syntax structure for the operating point.
max_temporal_id: Gives the maximum TemporalId of NAL units of this operating point.
frame_rate_info_flag equal to 0 indicates that no frame rate information is present for the operating point. The value 1 indicates that frame rate information is present for the operating point.
bit_rate_info_flag equal to 0 indicates that no bitrate information is present for the operating point. The value 1 indicates that bitrate information is present for the operating point.
chroma_format_idc indicates the chroma format that applies to this operating point. The following constraints apply for chroma_format_idc:
If this operating point contains only one layer, the value of sps_chroma_format_idc, as defined in ISO/IEC 23090-3, shall be the same in all SPSs referenced by the VCL NAL units in the VVC bitstream of this operating point, and the value of chroma_format_idc shall be equal to that value of sps_chroma_format_idc.
Otherwise (this operating point contains more than one layer), the value of chroma_format_idc shall be equal to the value of vps_ols_dpb_chroma_format[ MultiLayerOlsIdx[ output_layer_set_idx ] ], as defined in ISO/IEC 23090-3.
bit_depth_minus8 indicates the bit depth that applies to this operating point. The following constraints apply for bit_depth_minus8:
If this operating point contains only one layer, the value of sps_bitdepth_minus8, as defined in ISO/IEC 23090-3, shall be the same in all SPSs referenced by the VCL NAL units in the VVC bitstream of this operating point, and the value of bit_depth_minus8 shall be equal to that value of sps_bitdepth_minus8.
Otherwise(this operating point contains more than one layer), the value of bit_depth_minus8 shall be equal to the value of vps_ols_dpb_bitdepth_minus8[ MultiLayerOlsIdx[ output_layer_set_idx ] ], as defined in ISO/IEC 23090-3.
picture_width indicates the maximum picture width, in units of luma samples, that applies to this operating point. The following constraints apply for picture_width:
If this operating point contains only one layer, the value of sps_pic_width_max_in_luma_samples, as defined in ISO/IEC 23090-3, shall be the same in all SPSs referenced by the VCL NAL units in the VVC bitstream of this operating

TABLE 4-continued point, and the value of picture_width shall be equal to that value of sps_pic_width_max_in_luma_samples.
Otherwise (this operating point contains more than one layer), the value of picture_width shall be equal to the value of vps_ols_dpb_pic_width[ MultiLayerOlsIdx[ output_layer_set_idx ] ], as defined in ISO/IEC 23090-3.
picture_height indicates the maximum picture height, in units of luma samples, that applies to this operating point. The following constraints apply for picture_height:
If this operating point contains only one layer, the value of sps_pic_height_max_in_luma_samples, as defined in ISO/IEC 23090-3, shall be the same in all SPSs referenced by the VCL NAL units in the VVC bitstream of this operating point, and the value of picture_height shall be equal to that value of sps_pic_height_max_in_luma_samples.
Otherwise (this operating point contains more than one layer), the value of picture_height shall be equal to the value of vps_ols_dpb_pic_height[ MultiLayerOlsIdx[ output_layer_set_idx ] ], as defined in ISO/IEC 23090-3.
avgFrameRate gives the average frame rate in units of frames/(256 seconds) for the operating point. Value 0 indicates an unspecified average frame rate.
constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.
maxBitRate gives the maximum bit rate in bits/second of the stream of the operating point, over any window of one second.
avgBitRate gives the average bit rate in bits/second of the stream of the operating point.
entity_count specifies the number of tracks that are present in an operating point.
entity_idx specifies the index to the entity_id list in the entity group that belongs to an operating point.

Also, for example, a media file may include decoder configuration information for image/video content. That is, the media file may include a VVC decoder configuration record including decoder configuration information.

When the VVC decoder configuration record is stored in a sample entry, the VVC decoder configuration record may include a size of a length field used for each sample to represent a length of a NAL unit included in the VVC decoder configuration record as well as parameter sets, DCI, OPI, and SEI NAL units. The VVC decoder configuration record may be framed externally (a size of the VVC decoder configuration record is provided in a structure including the VVC decoder configuration record).

In addition, the VVC decoder configuration record may include a version field. For example, a version of the present disclosure may define version 1 of the VVC decoder configuration record. Incompatible changes to the VVC decoder configuration record may be indicated by a change of version number. If the version number is not recognized, readers shall not attempt to decode the VVC decoder configuration record or the stream to which the record applies.

Compatible extensions to the VVC decoder configuration record may not change the configuration version code. A reader should be prepared to ignore unrecognized data that goes beyond the definition of data that the reader understands.

When a track basically includes a VVC bitstream or when it resolves through 'subp' track references, VvcPtlRecord should exist in the decoder configuration record and in this case, a specific output layer set for a VVC bitstream is indicated by an output_layer_set_idx field. In addition, when ptl_present_flag in a decoder configuration record of a track is 0, the track should have an 'oref' track reference for an ID which may refer to a VVC track or an 'opeg' entity group.

When a stream described in the VVC decoder configuration record is decoded, values of syntax elements of VvcPTRecord, chroma_format_idc and bit_depth_minus8 may be valid for all parameter sets referred to. In particular, the following constraint may be applied.

A profile indication general_profile_idc indicates a profile which is followed by an output layer set identified by output_layer_set_idx in this configuration record.

A tier indication general_tier_flag indicates a tier which is greater than or equal to the highest tier indicated in all profile_tier_level( ) syntax structures (in all parameter sets) which are followed by an output layer set identified by output_layer_set_idx in this configuration record.

Each bit of general constraint info may be configured only when a bit is configured in all general_constraints_info( ) syntax structures in all profile_tier_level( ) syntax structures (in all parameter sets) which are followed by an output layer set identified by output_layer_set_idx in this configuration record.

A level indication general_level_idc may represent a level of capability equal to or greater than the highest level in all profile_tier_level( ) syntax structures (in all parameter sets) which are followed by an output layer set identified by output_layer_set_idx in this configuration record.

In addition, the following constraint may be applied to chroma_format_idc.

When a VVC stream to which a configuration record is applied is a single layer bitstream, a value of sps_chroma_format_idc defined in ISO/IEC 23090-3 is the same in all SPSs referred to by VCL NAL units in samples to which a current sample entry description is applied and a value of chroma_format_idc is the same as a value of sps_chroma_format_idc.

Otherwise (when a VVC stream to which a configuration record is applied is a multi-layer bitstream), a value of vps_ols_dpb_chroma_format[MultiLayerOlsIdx[output_layer_set_idx] ] defined in ISO/IEC 23090-3 is the same for all CVSs to which a current sample entry description is applied and a value of chroma_format_idc is the same as a value of vps_ols_dpb_chroma_format[MultiLayerOlsIdx[output_layer_set_idx] ].

The following constraint may be applied to bit_depth_minus8.

When a value of sps_chroma_format_idc defined in ISO/IEC 23090-3 is the same in all SPSs referred to by a NAL unit of a track, chroma_format_idc should be the same as sps_chroma_format_idc. When a VVC stream to which a configuration record is applied is a single layer bitstream, a value of sps_bitdepth_minus8 defined in ISO/IEC 23090-3 is the same in all SPSs referred to by VCL NAL units in samples to which a current sample entry description is applied and a value of bit_depth_minus8 is the same as a value of sps_bit-depth_minus8.

Otherwise (when a VVC stream to which a configuration record is applied is a multi-layer bitstream), a value of vps_ols_dpb_bitdepth_minus8[MultiLayerOlsIdx[output_layer_set_idx] ] defined in ISO/IEC 23090-3 is the same for all CVSs to which a current sample entry description is applied and a value of bit_depth_minus8 is the same as a value of vps_ols_dpb_bitdepth_minus8[MultiLayerOlsIdx[output_layer_set_idx]].

The following constraint may be applied to picture_width.

When a VVC stream to which a configuration record is applied is a single layer bitstream, a value of sps_pic_width_max_in_luma_samples defined in ISO/IEC 23090-3 is the same in all SPSs referred to by VCL NAL units in samples to which a current sample entry description is applied and a value of picture_width is the same as a value of sps_pic_width_max_in_luma_samples.

Otherwise (when a VVC stream to which a configuration record is applied is a multi-layer bitstream), a value of vps_ols_dpb_pic_width[MultiLayerOlsIdx[output_layer_set_idx] ] defined in ISO/IEC 23090-3 is the same for all CVSs to which a current sample entry description is applied and a value of picture_width is the same as a value of vps_ols_dpb_pic_width[MultiLayerOlsIdx[output_layer_set_idx] ].

The following constraint may be applied to picture_height.

When a VVC stream to which a configuration record is applied is a single layer bitstream, a value of sps_pic_height_max_in_luma_samples defined in ISO/IEC 23090-3 is the same in all SPSs referred to by VCL NAL units in samples to which a current sample entry description is applied and a value of picture_height is the same as a value of sps_pic_height_max_in_luma_samples.

Otherwise (when a VVC stream to which a configuration record is applied is a multi-layer bitstream), a value of vps_ols_dpb_pic_height[MultiLayerOlsIdx[output_layer_set_idx] ] defined in ISO/IEC 23090-3 is the same for all CVSs to which a current sample entry description is applied and a value of picture_height is the same as a value of vps_ols_dpb_pic_height[MultiLayerOlsIdx[output_layer_set_idx] ].

An explicit indication for a chroma format and a bit depth as well as other important format information used in a VVC video elementary stream may be provided in a VVC decoder configuration record. When a color space or a bit depth indication is different in VUI information of two sequences, two different VVC sample entries may be required.

In addition, for example, a set of arrays transmitting initialization non-VCL NAL units (initialization NAL units) may exist in the VVC decoder configuration record. The NAL unit types may be restricted to represent only DCI, OPI, VPS, SPS, PPS, prefix APS and prefix SEI NAL unit. NAL unit types reserved in ISO/IEC 23090-3 and the present disclosure may be defined in the future and a reader may have to ignore arrays having a NAL unit type of reserved or disallowed value.

Meanwhile, arrays may be in order of DCI, OPI, VPS, SPS, PPS, prefix APS, and prefix SEI.

A syntax of the above-described VVC decoder configuration record may be as shown in the following table.

TABLE 5

```
aligned(8) class VvcPTLRecord(num_sublayers) {
    bit(2) reserved = 0;
    unsigned int(6) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(8*num_bytes_constraint_info - 2)
        general_constraint_info;
    for (i=num_sublayers - 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers-2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc[j];
}
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit_depth_minus8;
        bit(6) reserved = '111111'b;
        unsigned_int(16) picture_width;
        unsigned_int(16) picture_height;
        VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

In addition, semantics for a syntax of the VVC decoder configuration record may be as shown in the following table.

TABLE 6 num_bytes_constraint_info is used to specify the length of the general_constraint_info field. The length of the general_constraint_info field is num_bytes_constraint_info *8-2

TABLE 6-continued bits. The value shall be greater than 0. The value equal to 1 indicates that the gci_present_flag in the general_constraint_info( ) syntax structure represented by the general_constraint_info field is equal to 0.
general_profile_idc, general_tier_flag, general_level_idc, ptl_frame_only_constraint_flag, ptl_multilayer_enabled_flag, general_constraint_info, sublayer_level_present[j], sublayer_level_idc[i], num_sub_profiles, and general_sub_profile_idc[j] contain the matching values for the fields or syntax structures general_profile_idc, general_tier_flag, general_level_idc, ptl_frame_only_constraint_flag, ptl_multilayer_enabled_flag, general_constraint_info( ), ptl_sublayer_level_present[i], sublayer_level_idc[i], ptl_num_sub_profiles, and general_sub_profile_idc[j] as defined in ISO/IEC 23090-3, for the stream to which this configuration record applies.
lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.
ptl_present_flag equal to 1 specifies that the track contains a VVC bitstream corresponding to the operating point specified by output_layer_set_idx and numTemporalLayers and all NAL units in the track belong to that operating point. ptl_present_flag equal to 0 specifies that the track may not contain a VVC bitstream corresponding to a specific operating point, but rather may contain a VVC bitstream corresponding to multiple output layer sets or may contain one or more individual layers that do not form an output layer set or individual sublayers excluding the sublayer with TemporalId equal to 0.
output_layer_set_idx specifies the output layer set index of an output layer set represented by the VVC bitstream contained in the track. The value of output_layer_set_idx may be used as the value of the TargetOlsIdx variable provided by external means or by an OPI NAL unit to the VVC decoder, as specified in ISO/IEC 23090-3, for decoding the bitstream contained in the track.
avgFrameRate gives the average frame rate in units of frames/(256 seconds), for the stream to which this configuration record applies. Value 0 indicates an unspecified average frame rate. When the track contains multiple layers and samples are reconstructed for the operating point specified by output_layer_set_idx and numTemporalLayers, this gives the average access unit rate of the bitstream of the operating point.
constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate. When the track contains multiple layers and samples are reconstructed for the operating point specified by output_layer_set_idx and numTemporalLayers, this gives the indication of whether the bitstream of the operating point has constant access unit rate.
numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.
chroma_format_idc indicates the chroma format that applies to this track.
bit_depth_minus8 indicates the bit depth that applies to this track.
picture_width indicates the maximum picture width, in units of luma samples, that applies to this track.
picture_height indicates the maximum picture height, in units of luma samples, that applies to this track.
track_ptl specifies the profile, tier, and level of the output layer set represented by the VVC bitstream contained in the track.
numArrays indicates the number of arrays of NAL units of the indicated type(s).
array_completeness when equal to 1 indicates that all NAL units of the given type are in the following array and none are in the stream; the permitted values are constrained by the sample entry name.
NAL_unit_type indicates the type of the NAL units in the following array (which shall be all of that type); it takes a value as defined in ISO/IEC 23090-3; it is restricted to take one of the values indicating a DCI, OPI, VPS, SPS, PPS, prefix APS or prefix SEI NAL unit.
numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.
nalUnitLength indicates the length in bytes of the NAL unit.
nalUnit contains a DCI, OPI, VPS, SPS, PPS, APS or declarative SEI NAL unit, as specified in ISO/IEC 23090-3.

For example, referring to Table 6, the syntax elements general_profile_idc, general_tier_flag, general_sub_profile_idc, general constraint info, general_level_idc, ptl_frame_only_constraint_flag, ptl_multilayer_enabled_flag, sublayer_level_present and sublayer_level_idc[i] may include matching values of fileds for a stream to which the VVC decoder configuration record, defined in ISO/IEC 23090-3, applies general_profile_idc, general_ tier_flag, general_sub_profile_idc, bits of general constraint info( ) general_level_idc, ptl_multilayer_enabled_flag, ptl_frame_only_constraint_flag, sublayer_level_present, and sublayer_level_idc[i]. Here, avgFrameRate may provide an average frame rate of a stream to which the VVC decoder configuration record is applied in units of frames/(256 seconds). A value of 0 may indicate an unspecified average frame rate.

Also, for example, referring to Table 6, the syntax element constantFrameRate may indicate a constant frame rate for the VVC decoder configuration record. For example, constantFrameRate equal to 1 may indicate that a stream to which the VVC decoder configuration record is applied is of a constant frame rate. A constantFrameRate equal to 2 may indicate that the representation of each temporal layer of the stream is of a constant frame rate. A constantFrameRate equal to 0 may indicate that the stream may or may not be of a constant frame rate.

Also, for example, referring to Table 6, the syntax element numTemporalLayers may indicate the number of temporal layers included in a track to which the VVC decoder configuration record is applied. For example, numTemporalLayers greater than 1 may indicate that the track to which the VVC decoder configuration record is applied is temporally scalable and the number of the temporal layers (referred to as temporal sublayers or sublayers in ISO/IEC 23090-3) included in the track is equal to numTemporalLayers. numTemporalLayers equal to 1 may indicate that a track to which the VVC decoder configuration record is applied is not temporally scalable. numTemporalLayers equal to 0 may indicate that it is unknown whether a track to which the VVC decoder configuration record is applied is temporally scalable.

Also, for example, referring to Table 6, the syntax element lengthSizeMinusOne plus 1 may indicate the length in bytes of the NALUnitLength field in the VVC video stream sample of the stream to which this configuration record is applied. For example, a size of one byte may be indicated by with a value of 0. The value of lengthSizeMinusOne may be one of 0, 1, or 3, corresponding to a length encoded as 1, 2, or 4 bytes, respectively.

Also, for example, referring to Table 6, the syntax element ptl_present_flag may indicate that a track includes a VVC bitstream corresponding to a specific output layer set, and thus may indicate whether or not PTL information is included. For example, ptl_present_flag equal to 1 may indicate that the track includes a VVC bitstream corresponding to a specific output layer set (specific OLS). ptl_present_flag equal to 0 may indicate that the track may not include a VVC bitstream corresponding to a specific OLS, but rather may include one or more individual layers that do not form an OLS or individual sublayers excluding the sublayer with TemporalId equal to 0.

Also, for example, referring to Table 6, the syntax element num_sub_profiles may define the number of sub profiles indicated in the VVC decoder configuration record.

Also, for example, referring to Table 6, the syntax element track_ptl may indicate a profile, tier, and level of an OLS indicated by a VVC bitstream included in a track.

Also, for example, referring to Table 6, the syntax element output_layer_set_idx may indicate an output layer set index of an output layer set indicated by a VVC bitstream included in a track. The value of output_layer_set_idx may be used as the value of the TargetOlsIdx variable provided by external means to the VVC decoder, as specified in ISO/IEC 23090-3, to decode the bitstream included in the track.

Also, for example, referring to Table 6, the syntax element chroma_format_present_flag may indicate whether chroma_format_idc is present. For example, chroma_format_present_flag equal to 0 may indicate that chroma_format_idc is not present. chroma_format_present_flag equal to 1 may indicate that chroma_format_idc is present.

Also, for example, referring to Table 6, the syntax element chroma_format_idc may indicate a chroma_format applied to the track. For example, the following constraints may be applied to chroma_format_idc.
   If the value of sps_chroma_format_idc defined in ISO/IEC 23090-3 is the same in all SPSs referenced by NAL units of a track, chroma_format_idc shall be equal to sp s chroma_format_idc.
   Otherwise, if ptl_present_flag is equal to 1, chroma_format_idc shall be equal to vps_ols_dpb_chroma_format [output_layer_set_idx] defined in ISO/IEC 23090-3.
   Otherwise (i.e., if the above conditions are not satisfied), chroma_format_idc is not present.

Also, for example, referring to Table 6, the syntax element bit_depth_present_flag may indicate whether bit_depth_minus8 is present. For example, bit_depth_present_flag equal to 0 may indicate that bit_depth_minus8 is not present. bit_depth_present_flag equal to 1 may indicate that bit_depth_minus8 is present.

Also, for example, referring to Table 6, a syntax element bit_depth_minus8 may indicate a bit depth applied to the track. For example, the following constraints may be applied to bit_depth_minus8.
   If the value of sps_bitdepth_minus8 defined in ISO/IEC 23090-3 is the same in all SPSs referred to by NAL units of a track, bit_depth_minus8 shall be equal to sps_bitdepth_minus8.
   Otherwise, if ptl_present_flag is equal to 1, bit_depth_minus8 shall be equal to vps_ols_dpb_bitdepth_minus8 [output_layer_set_idx] defined in ISO/IEC 23090-3.
   Otherwise (i.e., if the above conditions are not satisfied), bit_depth_minus8 is not present.

Also, for example, referring to Table 6, the syntax element numArrays may indicate the number of NAL unit arrays of the indicated type(s).

Also, for example, referring to Table 6, the syntax element array_completeness may indicate whether additional NAL units may be present in the stream. For example, array_completeness equal to 1 may indicate that all NAL units of a given type are in the following array and none are in the stream. Also, for example, array_completeness equal to 0 may indicate that additional NAL units of the indicated type may be in the stream. The default and permitted values may be constrained by the sample entry name.

Also, for example, referring to Table 6, the syntax element NAL_unit_type may indicate the type of NAL units in the following array (which shall be all of that type). NAL_unit_type may have a value defined in ISO/IEC 23090-2. In addition, NAL_unit_type may be restricted to have one of values indicating DCI, VPS, SPS, PPS, APS, prefix SEI or suffix SEI NAL unit.

Also, for example, referring to Table 6, the syntax element numNalus may indicate the number of NAL units of an indicated type included in the VVC decoder configuration record for a stream to which the VVC decoder configuration record is applied. An SEI array may include only SEI messages of a 'declarative' nature, that is, those that provide information on the stream as a whole. An example of such an SEI may be a user-data SEI.

Also, for example, referring to Table 6, the syntax element nalUnitLength may indicate the length in bytes of the NAL unit.

Also, for example, nalUnit may include DCI, VPS, SPS, PPS, APS or declarative SEI NAL unit specified in ISO/IEC 23090-3.

A VVC file format may define several types of the following tracks.

a) VVC track: A VVC track includes NAL units in samples thereof and sample entries and if possible, refers to other VVC tracks including other sub-layers of a VVC bitstream, and if possible, represents a VVC bitstream by referring to VVC sub-picture tracks. When a VVC track refers to VVC sub-picture tracks, it is referred to as a VVC base track.

b) VVC non-VCL track: APSs transmitting ALF, LMCS or scaling list parameters and other non-VCL NAL units may be stored in a track separate from a track including VCL NAL units and may be transmitted through it. It is a VVC non-VCL track.

c) VVC sub-picture track: A VVC sub-picture track may include one of the following; a sequence of at least one VVC sub-picture or a sequence of at least one complete slice forming a rectangular region.

A sample of a VVC sub-picture track may include one of the following; at least one complete sub-picture specified in ISO/IEC 23090-3 consecutive in decoding order or at least one complete slice which forms a rectangular region and is designated in ISO/IEC 23090-3 consecutive in decoding order.

VVC sub-pictures or slices included in any sample of a VVC sub-picture track may have consecutive decoding order.

In an example, when VVC non-VCL tracks and VVC sub-picture tracks are used, a VVC video may be optimally transmitted in a streaming application as follows. Each of these tracks may be carried in its own DASH representations and for decoding and rendering of a subset of tracks, DASH representations including a subset of VVC sub-picture tracks and DASH representations including non-VCL tracks may be requested by a client per segment. In this way, redundant transmission of APSs and other non-VCL NAL units may be avoided.

Meanwhile, in order to reconstruct an access unit from samples of multiple tracks carrying a multi-layer VVC bitstream, an operating point may be determined first. For example, when a VVC bitstream is represented by multiple VVC tracks, a file parser may identify the tracks needed for a chosen operating point as follows.

For example, a file parser may select a VVC bitstream based on 'vvcb' entity groups, corresponding 'vopi' sample groups and 'opeg' entity groups in a file. A file parser may select an operation point in an 'opeg' entity group or a 'vopi' sample group suitable for decoding capacity and application purposes.

When an 'opeg' entity group is present, it may indicate that a set of tracks exactly represents the selected operating point. Thus, a VVC bitstream may be reconstructed from the set of tracks and decoded.

In addition, when the 'opeg' entity group does not exist (i.e., when a 'vopi' sample group exists), a file parser may determine a set of tracks required to decode the selected operation point from a 'vvcb' entity group and a 'vopi' sample group.

In order to reconstruct a bitstream from a plurality of VVC tracks transmitting a VVC bitstream, it may be necessary to first determine a target highest value of TemporalId. When a plurality of tracks include data for an access unit, sorting of each sample in tracks may be performed based on sample decoding times. In other words, a time-to-sample table may be used without considering edit lists.

When a VVC bitstream is represented by multiple VVC tracks, the decoding times of the samples shall be such that if the tracks were combined into a single stream ordered by increasing the decoding time, the access unit order would be correct as specified in ISO/IEC 23090-3. Meanwhile, a sequence of access units may be reconstructed from respective samples in the required tracks according to the implicit restoration process described below. For example, the implicit reconstruction process of a VVC bitstream may be as follows.

For example, when an Operating Points Information sample group is present, a required track may be selected based on a layer and reference layers carrying as indicated in the operating point information sample group.

Also, for example, when an operating point entity group is present, a required track may be selected based on information in OperatingPointGroupBox.

In addition, for example, when reconstructing a bitstream including a sublayer for which the VCL NAL units have TemporalId greater than 0, all lower sublayers (i.e., sublayers for which the VCL NAL units have smaller TemporalId) within the same layer are also included in the resulting bitstream, and the required track may be selected accordingly.

In addition, for example, when reconstructing an access unit, picture units (defined in ISO/IEC 23090-3) from samples having the same decoding time may be placed into the access unit in increasing order of nuh_layer_id value.

When at least one of multi-picture units for an access unit has an AUD NAL unit, a first picture unit (i.e., a picture unit having the smallest value of nuh_layer_id) should have an AUD NAL unit, and while only the AUD NAL unit in a first picture unit is maintained in a reconstructed access unit, other AUD NAL unit is discarded when it exists. In the reconstructed access unit, when the AUD NAL unit has aud_irap_or_gdr_flag equal to 1 and the reconstructed access unit is not an IRAP or GDR access unit, a value of aud_irap_or_gdr_flag of the AUD NAL unit is configured to be equal to 0. For example, the AUD NAL unit in a first picture unit (PU) has aud_irap_or_gdr_flag equal to 1 and exists in a separate track, but other PU for the same access unit may have a picture which is not an IRAP or GDR picture. In this case, an aud_irap_or_gdr_flag value of the AUD NAL unit is changed from 1 to 0 in a reconstructed access unit.

When an Operating Points Entity Group does not exist, a final required track after being selected among tracks transmitting the same layer or sub-layer may collectively transmit some layers or sub-layers which still do not belong to a target operation point. A reconstructed bitstream for a target operation point should not include layers or sub-layers which are transmitted in a final required track, but do not belong to a target operation point.

In an example, VVC decoder implementation uses as input a bitstream corresponding to the highest TemporalId value of a target operation point and a target output layer set index corresponding to variable TargetOlsIdx and HighestTid respectively. A file parser should confirm whether it does not include other layers and sub-layers other than those included in a target operation point before transmitting a reconstructed bitstream to a VVC decoder.

In addition, for example, when an access unit is reconstructed by dependent layers and max_tid_ref_pics_plus1 is greater than 0, only sub-layers of reference layers for VCL NAL units having TemporalId which is smaller than or equal to max_tid_ref_pics_plus1−1 in the same layer (indicated in an operation point information sample group) are included in a result bitstream and a required track may be selected accordingly.

When max_tid_ref_pics_plus1 is equal to 0 when reconstructing an access unit having dependent layers, only a IRAP picture units and a GDR picture unit having ph_recovery_poc_cnt equal to 0 among all picture units of reference layers are included in a result bitstream and a required track may be selected accordingly.

Also, for example, if a VVC track includes a 'subp' track reference, each picture unit may be reconstructed as specified in clause 11.7.3 of ISO/IEC 23090-3 with additional constraints on EOS and EOB NAL units specified below. The process of clause 11.6.3 of ISO/IEC 23090-3 may be repeated for each layer of the target operating point in increasing order of nuh_layer_id. Otherwise, each picture unit may be reconstructed as follows.

Reconstructed access units may be placed into the VVC bitstream in increasing order of decoding time. As described further below, duplicates of end of bitstream (EOB) and end of sequence (EOS) NAL units may be removed from the VVC bitstream.

Also, for example, for access units that are within the same coded video sequence of a VVC bitstream and that belong to different sublayers stored in multiple tracks, there may be one or more tracks including the EOS NAL unit with a particular nuh_layer_id value in the respective samples. In this case, only one of the EOS NAL units may be kept in the last of these access units (the one with the greatest decoding time) in the final reconstructed bitstream, may be placed after all NAL units except for the EOB NAL unit (if present) of the last of these access units, and other EOS NAL units may be discarded. Similarly, there may be one or more tracks including an EOB NAL unit in respective samples. In this case, only one of the EOB NAL units may be kept in the final reconstructed bitstream, may be placed at the end of the last of these access units, and other EOB NAL units may be discarded.

Also, for example, since a specific layer or sublayer may be represented by one or more tracks, when finding out the required track for an operating point, it may have to be selected among the set of tracks that conveys the specific layer or the sublayer altogether.

In a procedure for reconstructing a picture unit from a sample in a VVC track by referring to VVC sub-picture tracks, a sample of a VVC track may be interpreted as a picture unit including the following NAL units in order of enumeration.

When existing in a sample, AUD NAL unit; when an AUD NAL unit exists in a sample, the AUD NAL unit is a first NAL unit in a sample.

When a sample is a first sample of a sample sequence associated with the same sample item, a parameter set and SEI NAL units included in a sample item (if any).

When at least one NAL unit that nal_unit_type is EOS_NUT, EOB_NUT, SUFFIX_APS_NUT, SUFFIX_SEI_NUT, FD_NUT, RSV_NVCL_27, UNSPEC_30 or UNSPEC_31 exists in a sample (a NAL unit having this NAL unit type may not be positioned before a first VCL NAL unit in a picture unit), NAL units of a sample excluding up to a first unit of these NAL units, or otherwise, all NAL units of a sample.

A content of a time-arranged (at a decoding time) resolved sample in each VVC sub-picture track referred to in order of VVC sub-picture tracks referred to in a 'subp' track reference (when num_subpic_ref_idx is 0 in the same group entry of a 'spor' sample group entry mapped to this sample) or in order designated in a 'spor' sample group description entry mapped to this sample (when num_subpic_ref_idx in the same group entry of a 'spor' sample group entry mapped to this sample is greater than 0). but, all DCI, OPI, VPS, SPS, PPS, AUD, PH, EOS, EOB and other AU-level or picture-level non-VCL NAL units (if any) are excluded.

All NAL units of a sample that nal_unit_type is EOS_NUT, EOB_NUT, SUFFIX_APS_NUT, SUFFIX_SEI_NUT, FD_NUT, RSV_NVCL_27, UNSPEC_30 or UNSPEC_31

When num_subpic_ref_idx of a 'spor' sample group description entry mapped to this sample is 0, each track reference of a 'subp' box may be interpreted as follows. Otherwise, each instance of a track reference subp_track_ref_idx may be interpreted as follows in a 'spor' sample group description entry mapped to this sample:—
When a track reference indicates a track ID of a VVC sub-picture track, a track reference may be interpreted as a VVC sub-picture track.
Otherwise (a track reference indicates an 'alte' track group), a track reference may be interpreted as one of tracks in an 'alte' track group. When it is confirmed that a specific track reference index value is a specific track of a previous sample, it may be interpreted as one of the following in a current sample:—The same specific track, or—another track in the same 'alte' track group including a synchronization sample which is time-arranged with a current sample. For example, a VVC sub-picture track of the same 'alte' track group is necessarily independent of other VVC sub-picture track referred to by the same VVC base track in order to avoid decoding discrepancy, so it may be restricted as follows:—All VVC sub-picture tracks include a VVC sub-picture. —Sub-picture boundaries are like picture boundaries.

When a reader selects VVC sub-picture tracks which include a VVC sub-picture having a series of sub-picture ID values different from an initial selection or a previous selection, the following steps may be performed:
Whether a PPS or SPS NAL unit needs to be changed may be determined by studying a 'spor' sample group description entry. For example, a SPS change may be possible only when a CLVS starts.
When a 'spor' sample group description entry indicates that start code emulation prevention bytes exist before or within sub-picture IDs of a NAL unit included therein, a RBSP may be derived from a NAL unit (i.e., start code emulation prevention bytes are removed). After overriding in the next step, start code emulation prevention may be performed again.
A reader may use sub-picture ID length information and a bit position in a 'spor' sample group entry to determine overwritten bits to update sub-picture IDs with selected items.
When sub-picture ID values of a PPS or a SPS are initially selected, a reader needs to rewrite a PPS or a SPS respectively with selected sub-picture ID values in a reconstructed access unit.
When sub-picture ID values of a PPS or a SPS are changed by comparing the same PPS ID value or SPS ID value (respectively) as a previous PPS or SPS (respectively), a reader should include a copy of a corresponding previous PPS and SPS (when a PPS or a SPS having the same PPS or SPS ID value respectively does not exist in an access unit) and it may rewrite a PPS or a SPS (respectively) with an updated sub-picture ID value in a reconstructed access unit.

When there is a 'minp' sample group description entry mapped to a sample of a VVC base track, the following operation may be applied:

A 'minp' sample group description entry is used to conclude a pps_mixed_nalu_types_inpic_flag value;

When the value is different from a value of a previous PPS NAL unit having the same PPS ID in a reconstructed bitstream, the following is applied: When a PPS is not included in a picture unit due to the step, a reader should include a copy of a PPS having an updated pps_mixed_nalu_types_inpic_flag value in a reconstructed picture unit; a reader may use a bit positions of a 'minp' sample group entry to determine an overwritten bit to update pps_mixed_nalu_types_inpic_flag.

A stream access point (SAP) sample group 'sap' may be used to provide information about all SAPs. When layer_id_method_idc is 0, a SAP may be interpreted as follows.

When a sample entry type is 'vvc1' or 'vvi1' and a sub-layer that TemporalId is 0 is not included in a track, a SAP may designate access to all sub-layers in a track.

Otherwise, a SAP may designate access to all layers in a track.

In an example, When a sample entry type is 'vvc1' or 'vvi1' and a sub-layer that TemporalId is 0 is not included in a track, a STSA picture having the same TemporalId as the lowest TemporalId in a track may serve as a SAP. In an example, a GDR picture of a VVC bitstream may be generally indicated as SAP type 4 in a 'sap' sample group. For example, a VVC may activate a sub-picture having different VCL NAL unit types in the same coded picture. Gradual decoding refresh is obtained by updating sub-pictures of each sub-picture index to an IRAP sub-picture in a scope of pictures. But, a VVC may not designate a decoding process starting from a picture having mixed VCL NAL unit types.

When all of the following matters are true (a sample of a VVC track refers to a PPS that pps_mixed_nalu_types_in_pic_flag is 1, for each sub-picture index i ranging from 0 to sps_num_subpics_minus1, sps_subpic_treated_as_pic_flag[i] is 1 and there is at least one IRAP sub-picture having the same sub-picture index i next or in a current sample in the same CLVS), the following may be applied (a sample may be indicated as a SAP sample of type 4, and a sample may be mapped to a 'roll' sample group description entry having a correct roll distance value for a decoding process of omitting decoding of a sub-picture having a specific sub-picture index before an IRAP sub-picture). When SAP sample groups are used, they may be used in all tracks transmitting the same VVC bitstream.

Regarding a random access recovery point sample group, a random access recovery point sample group 'roll' may be used to provide information about recovery points for gradual decoding refresh. When a 'roll' sample group is used with VVC tracks, a syntax and semantics of grouping_type_parameter may be designated in the same way as a 'sap' sample group of ISO/IEC 14496-12.

In an example, layer_id_method_idc equal to 0 and/or 1 may be used when pictures of target layers of a sample mapped to a 'roll' sample group are GDR pictures.

In an example, when layer_id_method_idc is equal to 0, a 'roll' sample group may designate an operation for all layers in a track. A semantics of layer_id_method_idc equal to 1 may be as specified in Section 9.5.7 of ISO/IEC 14496-12. layer_id_method_idc equal to 2 and/or 3 is used when all pictures of target layers of a sample mapped to a 'roll' sample group are not GDR pictures, and for pictures of target layers which are not GDR pictures, the following may be applied; a PPS referred to has pps_mixed_nalu_types_in_pic_flag equal to 1, for each sub-picture index i ranging from 0 to sps_num_subpics_minus1, sps_subpic_treated_as_pic_flag[i] is 1 and there may be at least one IRAP sub-picture having the same sub-picture index i next or in a current sample in the same CLVS.

In an example, when layer_id_method_idc is equal to 2, a 'roll' sample group may designate an operation for all layers in a track. A semantics of layer_id_method_idc equal to 3 may be as specified in Section 9.5.7 of ISO/IEC 14496-12.

When a reader uses a sample indicated as layer_id_method_idc equal to 2 or 3 to start decoding, a reader may need to ensure that a bitstream starting with a sample indicated as belonging to this sample group that layer_id_method_idc is 2 and/or 3 is a conforming bitstream by additionally modifying SPS, PPS and PH NAL units of a reconstructed bitstream according to Section 11.6 of ISO/IEC 14496-12 as follows. The following is about the modification.

All SPSs referred to by a sample may have sps_gdr_enabled_flag whose value is 1.

All PPSs referred to by a sample may have pps_mixed_nalu_types_in_pic_flag whose value is 0.

All VCL NAL units of an AU reconstructed from a sample may have the same nal_unit_type as GDR NUT.

All picture headers of an AU reconstructed from a sample may have ph_gdr_pic_flag whose value is 1 and have a ph_recovery_poc_cnt value corresponding to roll distance of a 'roll' sample group description entry to which a sample is mapped.

In an example, when a 'roll' sample group is related to a dependent layer but is not reference layer(s) thereof, a sample group may indicate a characteristic applied when all reference layers of a dependent layer are available and decoded. A sample group may be used to start decoding a prediction layer.

In an example, operation point information may be signaled in an entity group 'opeg' or a sample group 'vopi'. Meanwhile, sample reconstruction based on an operation point of an 'opeg' entity group does not require removal of a layer and/or a sub-layer which is not required for a decoding process for a given operation point. When it is not required to remove an unnecessary layer and/or sub-layer, it is not required to signal complete information of layer information for operation points, but detailed signaling for layers of an output layer set for a given operation point may be required.

Accordingly, the present disclosure proposes a solution to the above-described problem (need). Proposed embodiments may be applied individually or in combination.

In an example of an embodiment according to the present disclosure, for signaling of an operation point, a flag representing whether a list of layers of an output layer set (OLS) exists in signaling may exist. The flag may be referred to as ols_layers_infopresent_flag.

In an example of an embodiment according to the present disclosure, ols_layers_infopresent_flag may exist for all OLSs in an operation point signaling structure. When a value of ols_layers_infopresent_flag is 1, a list of layers of each OLS may exist and otherwise (when a value of ols_layers_infopresent_flag is 0), a list of layers of each OLS may not exist.

In an example of an embodiment according to the present disclosure, alternatively, ols_layers_infopresent_flag may exist for specific OLSs in an operation point signaling structure. When a value of ols_layers_infopresent_flag is 1, a list of layers for an OLS exists and otherwise (when a value of ols_layers_infopresent_flag is 0), a list of layers for an OLS may not exist.

In an example of an embodiment according to the present disclosure, when a list of layers for an OLS does not exist, information about an OLS mode as designated in a VVC bitstream specification may exist.

For example, as an embodiment according to the present disclosure, an operation point entity group configured as in the following table may be proposed.

TABLE 7

```
aligned(8) class OperatingPointGroupBox extends
EntityToGroupBox('opeg',0,0)
{
   unsigned int(8) num_profile_tier_level_minus1;
   for (i=0; i<=num_profile_tier_level_minus1; i++)
      VvcPTLRecord(0) opeg_ptl[i];
   bit(6) reserved = 0;
   unsigned int(9) num_olss;
   unsigned int(1) ols_layers_info_present_flag;
   for (i=0; i<num_olss; i++) {
```

TABLE 7-continued

```
      unsigned int(8) ptl_idx[i];
      unsigned int(9) output_layer_set_idx[i];
      unsigned int(6) layer_count[i];
      bit(1) reserved = 0;
      if (ols_layers_info_present_flag) {
         for (j=0; j<layer_count; j++) {
            unsigned int(6) layer_id[i][j];
            unsigned int(1) is_output_layer[i][j];
            bit(1) reserved = 0;
         }
      }
      else {
         unsigned int(6) reserved = 0;
         unsigned int(2) ols_mode_idc;
      }
   }
   bit(4) reserved = 0;
   unsigned int(12) num_operating_points;
```

TABLE 7-continued

```
   for (i=0; i<num_operating_points; i++) {
      unsigned int(9) ols_idx;
      unsigned int(3) max_temporal_id;
      unsigned int(1) frame_rate_info_flag
      unsigned int(1) bit_rate_info_flag
      bit(5) reserved = 0;
      unsigned int(2) chroma_format_idc;
      unsigned int(3) bit_depth_minus8;
      unsigned int(16) picture_width;
      unsigned int(16) picture_height;
      if (frame_rate_info_flag) {
         unsigned int(16) avgFrameRate;
         bit(6) reserved = 0;
         unsigned int(2) constantFrameRate;
      }
      if (bit_rate_info_flag) {
         unsigned int(32) maxBitRate;
         unsigned int(32) avgBitRate;
      }
      unsigned int(8) entity_count;
      for (j=0; j<entity_count; j++) {
         unsigned int(8) entity_idx;
      }
   }
}
...
```

In addition, a semantics for a syntax of an operation point entity group according to this embodiment may be as shown in the following table.

TABLE 8 ols_layers_info_present_flag specifies whether the list of layers that belong to output layer set is present or not.
num_olss specifies the number of output layer sets signalled in this syntax structure. The value of num_olss shall be less than or equal to the value of TotalNumOlss as specified in ISO/IEC 23090-3.
ptl_idx[i] specifies the zero-based index of the listed profile, tier, and level structure for the i-th output layer set signalled in this syntax structure.
output_layer_set_idx[i] is the output layer set index of the i-th output layer set signalled in this syntax structure .
layer_count[i] specifies the number of layers in the i-th output layer set signalled in this syntax structure.
layer_id[i][j] specifies the nuh_layer_id value for the j-th layer in the i-th output layer set signalled in this syntax structure.
is_output_layer[i][j] equal to 1 specifies that the j-th layer is an output layer in the i-th output layer set signalled in this syntax structure. is_output_layer[i][j] equal to 0 specifics that the j-th layer in not an output layer in the i-th output layer set signalled in this syntax structure.
ols_mode_idc[i] specifies the mode of the i-th output layer set as specified in ISO/IEC 23090-3 (i.e., corresponds to syntax element vps_ols_mode_idc).
...

In reference to the Table 7 and Table 8, information on the maximum picture width for an operation point (picture_width) and information on the maximum picture height for an operation point (picture_height) may be included/configured in an operation point entity group (may be signaled in an operation point entity group). The operation point entity group may include information on the number of operation points (num_operating_points) and based on information on the number of the operation points, information on the maximum picture width for each operation point and information on the maximum picture height for each operation point may be included/configured in an operation point entity group. Information on the picture width and information on the picture height, for signaling of the Table 7 and Table 8, may be also applied to an operation point information sample group. In other words, information on the maximum picture width for each operation point (picture_width) and information on the maximum picture height for each operation point (picture_height) may be included/configured in an operation point information sample group (it may be signaled in an operation point information sample group).

In reference to the Table 7 and Table 8, the operation point entity group may include PTL information. Here, for example, the PTL information may include a PTL index (ptl_idx) and/or information on a PTL structure (opeg_ptl[i]). For example, the PTL index (ptl_idx) may represent a profile, a tier and a level structure of an OLS represented by a (VVC) bitstream included in a track. For example, the PTL index may represent a profile, a tier and a level structure of an OLS represented by a bitstream in a track. In addition, for example, information on the PTL structure (opeg_ptl[i]) may represent a i-th profile, tier and level structure. The profile, tier and level structure may be referred to as a PTL structure.

In reference to the Table 7 and Table 8, a value of ols_layers_inforpresent_flag may be the same for all output layer sets. In other words, after signaling of ols_layers_inforpresent_flag, information on each i-th output layer set may be signaled.

In addition, for example, as another embodiment of the present disclosure, an operation point entity group configured as in the following table may be proposed.

TABLE 9

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    bit(7) reserved = 0;
    unsigned int(9) num_olss;
    for (i=0; i<num_olss; i++) {
        unsigned int(8) ptl_idx[i];
        unsigned int(9) output_layer_set_idx[i];
        unsigned int(6) layer_count[i];
        unsigned int(1) ols_layers_info_present_flag;
        if (ols_layers_info_present_flag) {
```

TABLE 9-continued

```
        else {
            unsigned int(6) reserved = 0;
            unsigned int(2) ols_mode_idc;
        }
    }
    bit(4) reserved = 0;
    unsigned int(12) num_operating_points;
    for (i=0; i<num_operating_points; i++) {
        unsigned int(9) ols_idx;
        unsigned int(3) max_temporal_id;
        unsigned int(1) frame_rate_info_flag;
        unsigned int(1) bit_rate_info_flag;
        bit(5) reserved = 0;
        unsigned int(2) chroma_format_idc;
        unsigned int(3) bit_depth_minus8;
        unsigned int(16) picture_width;
        unsigned int(16) picture_height;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
...
```

In addition, a semantics for a syntax of an operation point entity group according to this embodiment may be as shown in the following table.

TABLE 10 num_olss specifies the number of output layer sets signalled in this syntax structure. The value of num_olss shall be less than or equal to the value of TotalNumOlss as specified in ISO/IEC 23090-3.
ptl_idx[i] specifies the zero-based index of the listed profile, tier, and level structure for the i-th output layer set signalled in this syntax structure.
output_layer_set_idx[i] is the output layer set index of the i-th output layer set signalled in this syntax structure.
layer_count[i] specifies the number of layers in the i-th output layer set signalled in this syntax structure.
ols_layers_info_present_flag[i] specifies whether the list of layers that belong to the i-th output layer set is present or not.
layer_id[i][j] specifies the nuh_layer_id value for the j-th layer in the i-th output layer set signalled in this syntax structure.
is_output_layer[i][j] equal to 1 specifies that the j-th layer is an output layer in the i-th output layer set signalled in this syntax structure. is_output_layer[i][j] equal to 0 specifies that the j-th layer in not an output layer in the i-th output layer set signalled in this syntax structure.
ols_mode_idc[i] specifies the mode of the i-th output layer set as specified in ISO/IEC 23090-3 (i.e., corresponds to syntax element vps_ols_mode_idc).
...

TABLE 9-continued

```
        for (j=0; j<layer_count; j++) {
            unsigned int(6) layer_id[i][j];
            unsigned int(1) is_output_layer[i][j];
            bit(1) reserved = 0;
        }
    }
}
```

In reference to the Table 9 and Table 10, information on the maximum picture width for an operation point (picture_width) and information on the maximum picture height for an operation point (picture_height) may be included/configured in an operation point entity group (may be signaled in an operation point entity group). The operation point entity group may include information on the number of operation points (num_operating_points) and based on information on the number of the operation points, information on the maximum picture width for each operation point and information on the maximum picture height for each operation point may be included/configured in an operation point entity group. Information on the picture width and information on the picture height, for signaling of the Table 7 and Table 8, may be also applied to an operation point information sample group. In other words, information on the maximum picture width for each operation point (picture_width) and information on the maximum picture height for each operation point (picture_height) may be included/configured in an operation point information sample group (it may be signaled in an operation point information sample group).

In reference to the Table 9 and Table 10, the operation point entity group may include PTL information. Here, for example, the PTL information may include a PTL index (ptl_idx) and/or information on a PTL structure (opeg_ptl [i]). For example, the PTL index (ptl_idx) may represent a profile, a tier and a level structure of an OLS represented by a (VVC) bitstream included in a track. For example, the PTL index may represent a profile, a tier and a level structure of an OLS represented by a bitstream in a track. In addition, for example, information on the PTL structure (opeg_ptl[i]) may represent a i-th profile, tier and level structure. The profile, tier and level structure may be referred to as a PTL structure.

In reference to the Table 9 and Table 10, output_layers_info_present_flag may be individually signaled for each i-th output layer set. Accordingly, a value of output_layers_info_present_flag may not be the same for each i-th output layer set.

According to embodiments of the present disclosure, since whether a list of layer IDs for each output layer set exists is checked with a flag, efficiency of signaling may be improved by reducing signaling for unnecessary information.

According to embodiments of the present disclosure, individual information for each output layer set may be signaled and accordingly, accuracy of picture reconstruction may be increased and subjective/objective image quality of a reconstructed picture may be improved.

Figure 4:
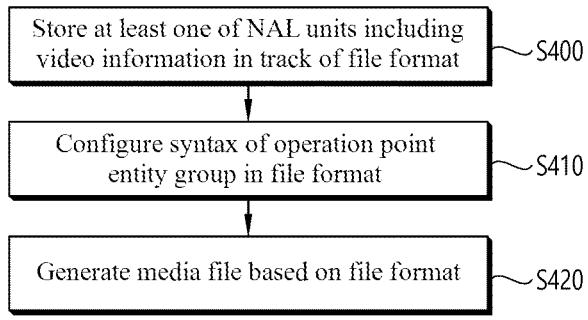
FIG. 4 roughly shows a method of generating a media file according to an embodiment of the present disclosure.

FIG. 4 roughly shows a method of generating a media file according to an embodiment of the present disclosure. A method disclosed in FIG. 4 may be performed by a media file generation device disclosed in FIG. 5. A media file generation device may generate a media file including video information. Specifically, for example, an image processing unit of the media file generation device in FIG. 5 may perform S400 and S410 in FIG. 4 and a media file generation unit of the media file generation device in FIG. 5 may perform S420 in FIG. 4. In addition, although not shown, a process of encoding a bitstream including image information may be performed by an encoder of the media file generation device.

A media file generation device may store video information in a track of a file format S400. Here, video information may include network abstraction layer (NAL) units. NAL units may include VCL NAL units and/or non-VCL NAL units.

A media file generation device may configure a syntax of an operation point entity group in the file format S410. The operation point entity group may include information related to mapping of the track for operation points and information on the operation points. An operation point may be related to an output layer set, a max TemporalId value and profile/level/tier signaling. Layer-related information of an encoded bitstream may be determined based on an operation point.

A media file generation device may generate a media file based on the file format S420. The media file may contain sample entries and tracks. In addition, a media file may include a variety of records such as a decoder configuration record and for example, the NAL units may be included in a decoder configuration record.

In an example, the operation point entity group may include flag information on whether a list of layers exists.

In an example, the layers may belong to an output layer set related to at least one of the operation points.

In an example, the flag information may exist for a specific output layer set in the operation point entity group.

In an example, a list of layers for the specific output layer set may exist based on the flag information having a value of 1. A list of layers for the specific output layer set may not exist based on the flag information having a value of 0.

In an example, based on the flag information having a value of 1, the syntax of the operation point entity group may include information related to which layer is an output layer.

In an example, the file format may include information on the maximum picture width for the operation point and information on the maximum picture height for the operation point. The information on the maximum picture width and the information on the maximum picture height may be used to select the operation point. For example, the information on the maximum picture width for the operation point and the information on the maximum picture height for the operation point may be configured in the operation point entity group and/or the operating point information sample group.

In an example, the operation point entity group and/or the operation point information sample group may include information on the number of operation points. Based on the number of the operation points, information on an operation point may be configured in the operation point entity group and/or the operation point information sample group.

In an example, the operation point entity group may include information on mapping of the tracks and the operation points. For example, a plurality of tracks may be mapped to one operation point or one track may be mapped to a plurality of operation points. A mapping relationship between tracks and operation points may be related to a layer for coding (including an output layer).

In an example, the operation point entity group and/or the operation point information sample group box may include flag information representing whether frame rate related information exists for the operation point. Based on the flag information equal to 1, the operation point entity group and/or the operation point information sample group box may include information on an average frame rate for the operation point and information on a constant frame rate for the operation point. For example, a syntax element of information on the average frame rate may be avgFrameRate and a syntax element of information on the constant frame rate may be constantFrameRate.

For example, information on the average frame rate may represent an average frame rate for the operation point (in a unit of frame/(256 seconds)). A value of 0 may represent an undesignated average frame rate. In other words, when a value of information on the average frame rate is 0, information on the average frame rate may represent an undesignated average frame rate.

In addition, for example, information on the constant frame rate may represent a constant frame rate for the operation point. For example, information on the constant frame rate may represent whether a constant frame rate is used. For example, when a value of information on the constant frame rate is 1, information on the constant frame rate may represent that a stream of the operation point is a constant frame rate. In addition, for example, when a value of information on the constant frame rate is 2, information on the constant frame rate may represent that a representation of each temporal layer of the stream is a constant frame rate. In addition, for example, when a value of information on the constant frame rate is 0, information on the constant frame rate may represent that the stream may be a constant frame rate or not.

In an example, the operation point entity group may include information on the number of tracks in the operation point. The operation point entity group may include information on an index related to ID values of the tracks existing in the operation point. For example, information on the index may represent an index for an entity ID list in an entity group belonging to the operation point.

In an example, the operation point may be related to an output layer set (OLS). The operation point entity group and/or the operation point information sample group may include information on an index of the output layer set.

Here, for example, the OLS index may represent an OLS index of an OLS represented by a (VVC) bitstream included in a track. In other words, the OLS index may indicate an OLS represented by a VVC bitstream included in a track. A value of the OLS index may be used as a value of a target OLS index to decode a bitstream included in a track. A syntax element of the OLS index may be the above-described output_layer_set_idx.

Figure 5:
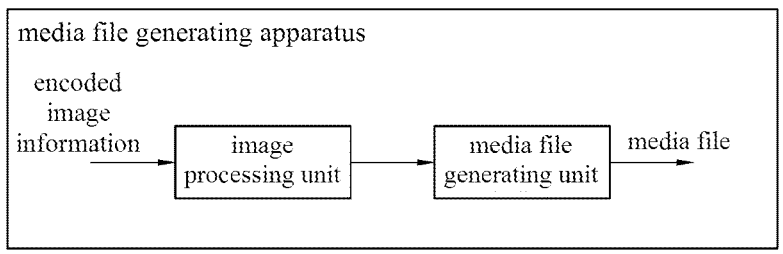
FIG. 5 roughly shows a media file generation device according to the present disclosure.

FIG. 5 roughly shows a media file generation device according to the present disclosure. A method disclosed in FIG. 4 may be performed by a media file generation device disclosed in FIG. 5. Specifically, for example, an image processing unit of the media file generation device in FIG. 5 may perform S400 and S410 in FIG. 4 and a media file generation unit of the media file generation device in FIG. 5 may perform S420 in FIG. 4. In addition, although not shown, a process of encoding a bitstream including image information may be performed by an encoder of the media file generation device.

Meanwhile, although not shown, a media file generation device may store the generated media file in a (digital) storage medium or transmit to a media file processing device through a network or a (digital) storage medium. Here, a network may include a broadcasting network and/or a communication network and a digital storage medium may include a variety of storage media such as USB, SD, CD, DVD, Blu-ray, HDD, SSD, etc.

Figure 6:
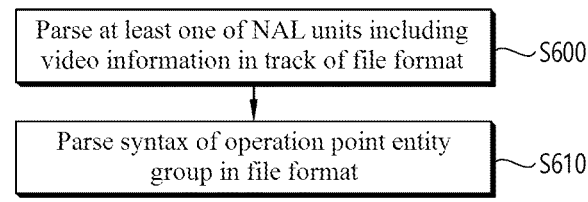
FIG. 6 roughly shows a method of processing a media file according to an embodiment of the present disclosure.

FIG. 6 roughly shows a method of processing a media file according to an embodiment of the present disclosure. A method disclosed in FIG. 6 may be performed by a media file processing device disclosed in FIG. 7. Specifically, for example, a reception unit of the media file processing device in FIG. 7 may perform a step of acquiring a media file processed in a method of FIG. 6 and a media file processing unit of the media file processing device in FIG. 7 may perform S600 to S610 in FIG. 6.

A media file processing device acquires a media file including a decoder configuration record. For example, a media file processing device may acquire the media file through a network or a (digital) storage medium. Here, a network may include a broadcasting network and/or a communication network and a digital storage medium may include a variety of storage media such as USB, SD, CD, DVD, Blu-ray, HDD, SSD, etc. The media file may contain sample entries and tracks. In addition, a media file may include a variety of records such as a decoder configuration record and for example, the NAL units may be included in a decoder configuration record.

A media file processing device may derive a file format from the media file. The file format may include information related to an operation point.

A media file processing device may parse at least one of NAL units including the video information in a track of a file format from the media file S600. The video information may be a bitstream including NAL units. The NAL units may include VCL NAL units and/or non-VCL NAL units. The video information may include tracks selected based on layers (or reference layers) indicated by information on the operation point.

A media file processing device may parse a syntax of an operation point entity group in the file format S610. For example, the operation point entity group may include information related to mapping of the track for operation points and information on the operation points. An operation point may be related to an output layer set, a max TemporalId value and profile/level/tier signaling. Layer-related information of an encoded bitstream may be determined based on an operation point.

In an example, the operation point entity group may include flag information on whether a list of layers exists.

In an example, the layers may belong to an output layer set related to at least one of the operation points.

In an example, the flag information may exist for a specific output layer set in the operation point entity group.

In an example, a list of layers for the specific output layer set may exist based on the flag information having a value of 1. A list of layers for the specific output layer set may not exist based on the flag information having a value of 0.

In an example, based on the flag information having a value of 1, the syntax of the operation point entity group may include information related to which layer is an output layer.

In an example, the file format may include information on the maximum picture width for the operation point and information on the maximum picture height for the operation point. The information on the maximum picture width and the information on the maximum picture height may be used to select the operation point. For example, the information on the maximum picture width for the operation point and the information on the maximum picture height for the operation point may be configured in the operation point entity group and/or the operating point information sample group.

In an example, the operation point entity group and/or the operation point information sample group may include information on the number of operation points. Based on the number of the operation points, information on an operation point may be configured in the operation point entity group and/or the operation point information sample group.

In an example, the operation point entity group may include information on mapping of the tracks and the operation points. For example, a plurality of tracks may be mapped to one operation point or one track may be mapped to a plurality of operation points. A mapping relationship between tracks and operation points may be related to a layer for coding (including an output layer).

In an example, the operation point entity group and/or the operation point information sample group may include flag information representing whether frame rate related information exists for the operation point. Based on the flag information equal to 1, the operation point entity group and/or the operation point information sample group may include information on an average frame rate for the operation point and information on a constant frame rate for the operation point. For example, a syntax element of information on the average frame rate may be avgFrameRate and a syntax element of information on the constant frame rate may be constantFrameRate.

For example, information on the average frame rate may represent an average frame rate for the operation point (in a unit of frame/(256 seconds)). A value of 0 may represent an undesignated average frame rate. In other words, when a value of information on the average frame rate is 0, information on the average frame rate may represent an undesignated average frame rate.

In addition, for example, information on the constant frame rate may represent a constant frame rate for the operation point. For example, information on the constant frame rate may represent whether a constant frame rate is used. For example, when a value of information on the constant frame rate is 1, information on the constant frame rate may represent that a stream of the operation point is a constant frame rate. In addition, for example, when a value of information on the constant frame rate is 2, information on the constant frame rate may represent that a representation of each temporal layer of the stream is a constant frame rate. In addition, for example, when a value of information on the constant frame rate is 0, information on the constant frame rate may represent that the stream may be a constant frame rate or not.

In an example, the operation point entity group may include information on the number of tracks in the operation point. The operation point entity group may include information on an index related to ID values of the tracks existing in the operation point. For example, information on the index may represent an index for an entity ID list in an entity group belonging to the operation point.

In an example, the operation point may be related to an output layer set (OLS). The operation point entity group and/or the operation point information sample group may include information on an index of the output layer set.

Here, for example, the OLS index may represent an OLS index of an OLS represented by a (VVC) bitstream included in a track. In other words, the OLS index may indicate an OLS represented by a VVC bitstream included in a track. A value of the OLS index may be used as a value of a target OLS index to decode a bitstream included in a track. A syntax element of the OLS index may be the above-described output_layer_set_idx.

Figure 7:
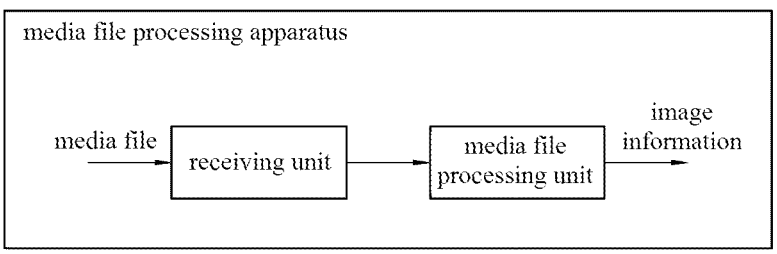
FIG. 7 roughly shows a device of processing a media file according to the present disclosure.

FIG. 7 roughly shows a device of processing a media file according to the present disclosure. A method disclosed in FIG. 6 may be performed by a media file processing device disclosed in FIG. 7. Specifically, for example, a reception unit of the media file processing device in FIG. 7 may perform a step of acquiring a media file processed in a method of FIG. 6 and a media file processing unit of the media file processing device in FIG. 7 may perform S600 to S610 in FIG. 6. Meanwhile, although not shown, a media file processing device may include a decoder and the decoder may decode a bitstream based on the operation point information sample group or the operation point information sample group.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 8:
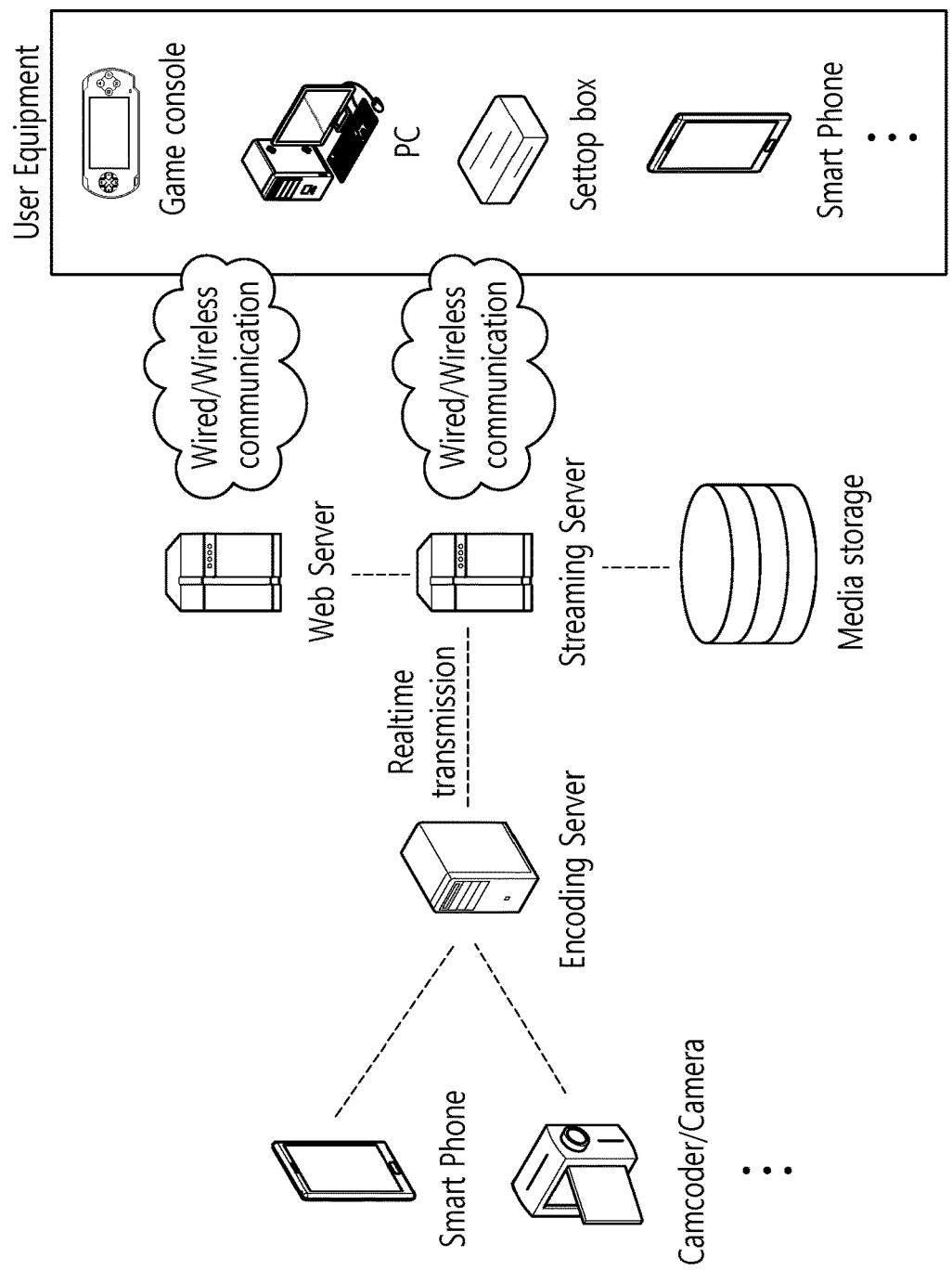
FIG. 8 illustrates a structural diagram of a contents streaming system to which the present disclosure is applied.

FIG. 8 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for generating a media file including video information, the method comprising:
   storing at least one of network adaptation layer (NAL) units including the video information in a track of a file format;
   configuring a syntax of an operating point entity group in the file format, wherein the syntax of the operating point entity group includes information for the operation points; and
   generating the media file based on the file format,
   wherein the syntax of the operating point entity group includes flag information indicating whether a list of layers that belong to an output layer set related to the syntax of the operating point entity group is present or not, and
   wherein based on a value of the flag information being equal to 1, the syntax of the operating point entity group includes information for specifying whether each layer in the output layer set is an output layer.

2. The method of claim 1, wherein the flag information is present for a specific output layer set in the operating point entity group.

3. The method of claim 2, wherein based on the value of the flag information being equal to 1, the list of layers for the specific output layer set is present, and
   wherein based on the value of the flag information being equal to 0, the list of layers for the specific output layer set is not present.

4. The method of claim 1, wherein the syntax of the operating point entity group includes information for a number of operating points.

5. The method of claim 1, wherein the syntax of the operating point entity group includes flag information indicating whether frame rate related information is present for the operating points, and
   wherein based on the value of the flag information being equal to 1, the syntax of the point entity group includes information for an average frame rate for the operating points and information for a constant frame rate for the operating points.

6. A media file generation device, comprising:
   a memory; and
   at least one processor connected to the memory, wherein the at least one processor is configured to:
   store at least one of network adaptation layer (NAL) units including video information in a track of a file format;
   configure a syntax of an operating point entity group in the file format, wherein the syntax of the operating point entity group includes information for the operating points; and
   generate the media file based on the file format,
   wherein the syntax of the operating point entity group includes flag information indicating whether a list of layers that belong to an output layer set related to the syntax of the operating point entity group is present or not, and
   wherein based on a value of the flag information being equal to 1, the syntax of the operating point entity group includes information for specifying whether each layer in the output layer set is an output layer.

7. A method for processing a media file including video information, the method comprising:
   parsing at least one of network adaptation layer (NAL) units including the video information in a track of a file format from the media file; and
   parsing a syntax of an operating point entity group in the file format, wherein the syntax of the operating point entity group includes information for the operation points,
   wherein the syntax of the operating point entity group includes flag information indicating whether a list of layers that belong to an output layer set related to the syntax of the operating point entity group is present or not, and
   wherein based on a value of the flag information being equal to 1, the syntax of the operating point entity group includes information for specifying whether each layer in the output layer set is an output layer.

8. The method of claim 7, wherein the flag information is present exists for a specific output layer set in the operating point entity group.

9. The method of claim 8, wherein based on the value of the flag information being equal to 1, the list of layers for the specific output layer set is present, and wherein based on the value of the flag information being equal to 0, the list of layers for the specific output layer set is not present.

10. The method of claim 7, wherein the syntax of the operating point entity group includes information for a number of operating points.

11. The method of claim 7, wherein the syntax of the operating point entity group includes flag information indicating whether frame rate related information is present for the operating points, and wherein based on the value of the flag information being equal to 1, the syntax of the operating point entity group includes information for an average frame rate for the operating points and information for a constant frame rate for the operating points.

12. A media file processing device, comprising:

a memory; and at least one processor connected to the memory, wherein the at least one processor is configured to:

parse at least one of network adaptation layer (NAL) units including video information in a track of a file format from the media file; and parse a syntax of an operating point entity group in the file format, wherein the syntax of the operating point entity group includes information for the operating points, wherein the syntax of the operating point entity group includes flag information indicating whether a list of layers that belong to an output layer set related to the syntax of the operating point entity group is present or not, and wherein based on a value of the flag information being equal to 1, the syntax of the operating point entity group includes information for specifying whether each layer in the output layer set is an output layer.

* * * * *